United States Patent
Sakata

(10) Patent No.: US 8,764,205 B2
(45) Date of Patent: Jul. 1, 2014

(54) VEHICLE OUTSIDE MIRROR DEVICE

(75) Inventor: Ikuo Sakata, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 14 days.

(21) Appl. No.: 13/523,148

(22) Filed: Jun. 14, 2012

(65) Prior Publication Data
US 2013/0010379 A1 Jan. 10, 2013

(30) Foreign Application Priority Data
Jul. 5, 2011 (JP) ................................ 2011-149391

(51) Int. Cl.
*G02B 5/08* (2006.01)

(52) U.S. Cl.
USPC ........................................ 359/841; 359/844

(58) Field of Classification Search
None
See application file for complete search history.

(56) References Cited

U.S. PATENT DOCUMENTS

| | | | | |
|---|---|---|---|---|
| 5,467,222 A | * | 11/1995 | Oishi | 359/841 |
| 2010/0238570 A1 | * | 9/2010 | Reedman et al. | 359/841 |

FOREIGN PATENT DOCUMENTS

| | | |
|---|---|---|
| EP | 0 64 084 B1 | 3/1995 |
| EP | 1 369 301 B1 | 12/2003 |
| EP | 2 042 375 B1 | 4/2009 |
| EP | 2 368 762 A1 | 9/2011 |
| JP | 2001-287594 A | 10/2001 |

* cited by examiner

*Primary Examiner* — Jade R Chwasz
(74) *Attorney, Agent, or Firm* — Foley & Lardner LLP

(57) ABSTRACT

A vehicle outside mirror device includes a first rotation restraining mechanism and a second rotation restraining mechanism. As a result, the device is capable of restraining a rotation to a storage location and a rotation of a forward tilt location of a mirror assembly that is positioned in a use location. In this manner, the mirror assembly is rotated from the use location to the storage location by electrically driving an electrically driven storage unit, and then, even in a case where the mirror assembly has been restored from the storage location to the use location in a manually driven manner, in other words, even in a case where a clutch mechanism is disengaged, it becomes possible to lock the mirror assembly that is positioned in the use location.

8 Claims, 20 Drawing Sheets

VEHICLE OUTSIDE MIRROR DEVICE

CROSS REFERENCE TO RELATED APPLICATIONS

This application claims priority of Japanese Patent Application No. 2011-149391 filed on Jul. 5, 2011. The contents of this application are incorporated herein by reference in their entirety.

BACKGROUND OF THE INVENTION

1. Field of the Invention

The present invention relates to a vehicle outside mirror device enabling a mirror assembly to be mounted to enable rotation (tilting or turning) on a vehicle body via an electrically driven storage unit and a base. In other words, the present invention relates to a vehicle outside mirror device such as an electrically storage type door mirror, for example.

2. Description of the Related Art

A vehicle outside mirror of such type is conventionally known (for example, Japanese Unexamined Patent Application Publication No. 2001-287594). The conventional vehicle outside mirror device is the one in which a mirror is rotated between an erected location and a storage location by means of a storage mechanism, and in a case where the mirror positioned in the erected location is subjected to an external force of a predetermined value or more applied to a forward tilt location side, the mirror is rotated to the forward tilt location for the sake of buffering.

However, the conventional vehicle outside mirror device has entailed a problem so far, as described below. In other words, even in a case where the mirror is rotated from the erected location to the storage location by means of the storage mechanism and then the mirror is rotated (restored) in a manually driven manner from the storage location to the erected location, a clutch mechanism is disengaged; and therefore, the mirror is established in a free state, and the mirror may vibrate due to a vehicle vibration.

The present invention has been made in order to solve the problem described above, and it is an object of the present invention is to provide a vehicle outside mirror device in which a mirror assembly is rotated from a use location to a storage location by electrically driving an electrically driven storage unit, and then, in a case where the mirror assembly has been rotated (restored) in a manually driven manner from the storage location to the use location, the mirror assembly is locked to thereby prevent the mirror assembly from a vibration which may be exerted by a vehicle vibration.

SUMMARY OF THE INVENTION

According to a first aspect of the invention, the electrically driven storage unit has a clutch mechanism that is provided at the rotation force transmission mechanism, that is not disengaged by means of an electrically driven rotation force of the motor and the rotation force transmission mechanism, and that is disengaged with use of a force greater than the electrically driven rotation force to thereby enable the mirror assembly to be rotatable relative to the shaft; and a holding mechanism for locking a mirror assembly that is positioned in a use location in a case where the clutch mechanism is disengaged.

According to a second aspect of the invention, the holding mechanism has a first rotation restraining mechanism for restraining a rotation to a storage location of the mirror assembly that is positioned in a use location, the first restraining mechanism being disengaged by means of the electrically driven rotation force to thereby allow for the rotation to the storage location of the mirror assembly that is positioned in the use location; a second rotation restraining mechanism for restraining rotation to a forward tilt location of the mirror assembly that is positioned in the use location; and a buffering mechanism being disengaged with use of a force (a manually driven force or a force that is exerted in a case where something hits against the mirror assembly) other than the electrically driven rotation force to thereby allow for a rotation to the forward tilt location of the mirror assembly that is positioned in the use location.

According to a third aspect of the invention, a time of an occurrence of a torque of the clutch mechanism and a time of an occurrence of a torque of the first rotation restraining mechanism have a time difference therebetween, a respective one of the torques occurring when the mirror assembly that is positioned in the use location is rotated to the storage location with use of a force (a manually driven force or a force that is exerted in a case where something hits against the mirror assembly) other than the electrically driven rotation force.

According to a fourth aspect of the invention, a time of an occurrence of a torque of the buffering mechanism, a time of an occurrence of a torque of the clutch mechanism, and a time of an occurrence of a torque of the first rotation restraining mechanism have a time difference therebetween, a respective one of the torques occurring when the mirror assembly that is positioned in the use location is rotated to the forward tilt location with use of a force (a manually driven force or a force that is exerted in a case where something hits against the mirror assembly) other than the electrically driven rotation force.

A vehicle outside mirror device according to the first aspect of the present invention is provided in such a manner that even in a case where a clutch mechanism is disengaged, a mirror assembly can be locked by means of a holding mechanism, thus making it possible to reliably prevent a vibration of the mirror assembly which may be exerted by a vehicle vibration.

A vehicle outside mirror device according to the second aspect of the present invention is provided in such a manner that a rotation to a storage location of a mirror assembly that is positioned in a use location and a rotation to a forward tilt location can be restrained by means of a first rotation restraining mechanism and a second rotation restraining mechanism of a holding mechanism. In this manner, the vehicle outside mirror device according to the second aspect of the present invention is provided in such a manner that even in a case where the mirror assembly is rotated from the use location to the storage location by electrically driving an electrically driven storage unit and then the mirror assembly is rotated (restored) in manually driven manner from the storage location to the use location, in other words, even in a case where a clutch mechanism is disengaged, the mirror assembly that is positioned in the use location can be locked, thus making it possible to reliably prevent a vibration of the mirror assembly which may be exerted by a vehicle vibration.

Further, the vehicle outside mirror device according to the second aspect of the present invention is provided in such a manner that by means of the clutch mechanism, the mirror assembly that is positioned in the use location can be rotated to the storage location by means of a force other than an electrically driven rotation force. Furthermore, in the vehicle outside mirror device according to the second aspect of the present invention, the mirror assembly that is positioned in the use location can be rotated to a forward tilt location with the use of a force other than an electrically driven rotation force by means of the clutch mechanism and a buffering mechanism of a holding mechanism. As a result, the vehicle outside mirror device according to the second aspect of the present invention has a function of buffering action.

A vehicle outside mirror device according to the third aspect of the present invention is capable of displacing a peak in torque of a clutch mechanism and a peak in torque of a first rotation restraining mechanism that may occur when a mirror assembly that is positioned in a use location is rotated to a storage location with the use of a force other than an electrically driven rotation force, by means for solving the problem described previously. As a result, the vehicle outside mirror device according to the third aspect of the present invention is capable of dispersing a torque at the time of applying of a buffering action, thus making it possible to further reliably work a buffering action for an impact against a mirror device itself or the mirror assembly.

A vehicle outside mirror device according to the fourth aspect of the present invention is capable of displacing a peak in torque of an interference mechanism, a peak in torque of a clutch mechanism, and a peak in torque of a first rotation restraining mechanism, which may occur when a mirror assembly that is positioned in a use location is rotated to a forward tilt location with the use of a force other than an electrically driven rotation force, by means for solving the problem described previously. As a result, the vehicle outside mirror device according to the forth aspect of the present invention is capable of dispersing a torque at the time of applying of a buffering action, thus making it possible to further reliably work a buffering action for an impact against a mirror device itself or the mirror assembly.

DESCRIPTION OF THE PREFERRED EMBODIMENTS

Hereinafter, two of the exemplary embodiments of a vehicle outside mirror device according to the present invention will be described in detail with reference to the drawings. It is to be noted that the present invention is not limited by these embodiments.

[First Exemplary Embodiment]

(Description of Configuration)

Figure 1:
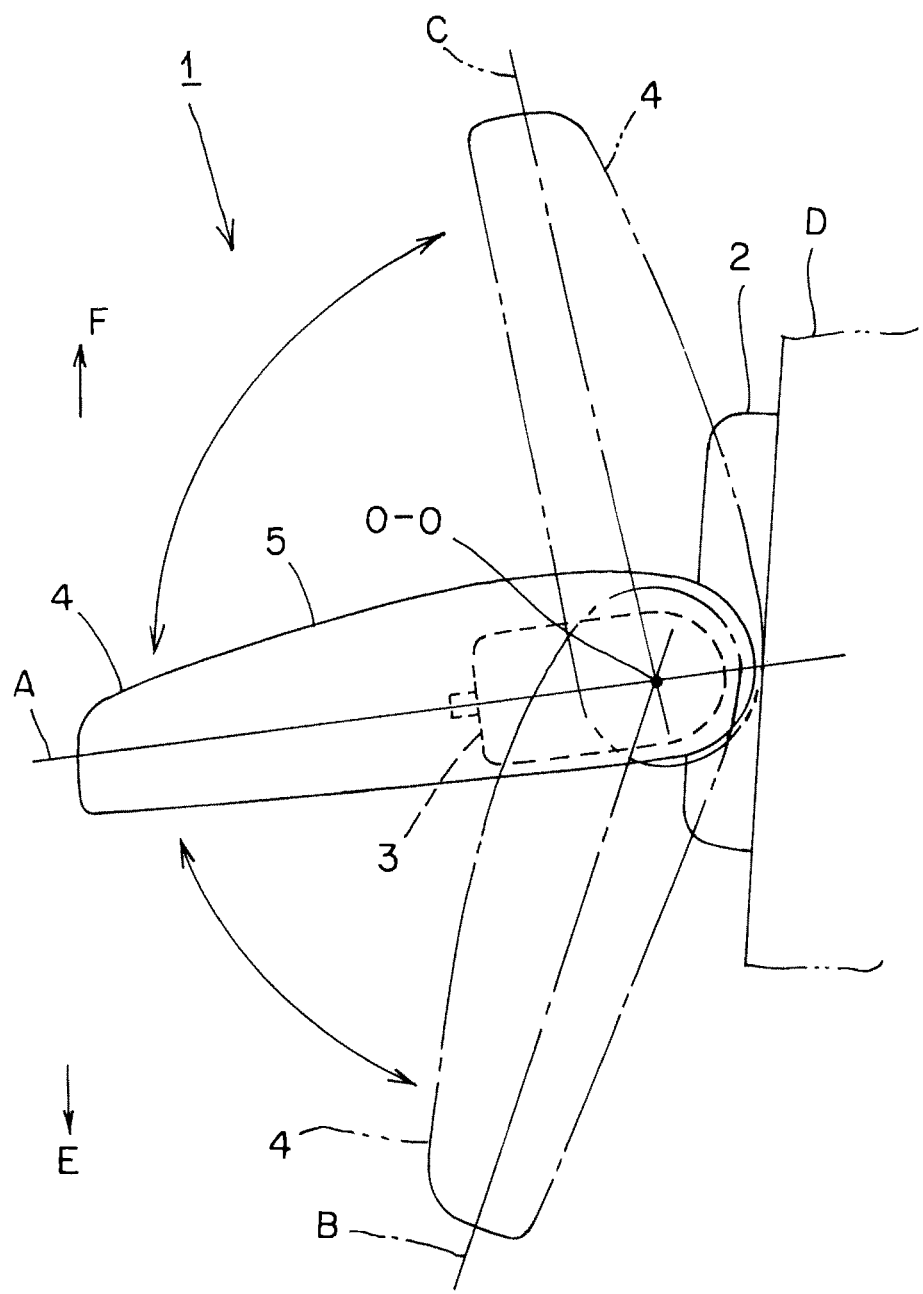
FIG. 1 is a plan view of a use state showing an outside mirror device according to a first exemplary embodiment of the present invention.

FIG. 1 to FIG. 22 each show a vehicle outside mirror device according to a first embodiment of the present invention. Hereinafter, a configuration of the vehicle outside mirror device in the exemplary embodiment will be described. In FIG. 1, reference numeral 1 designates the vehicle outside mirror device in the exemplary embodiment. In this example, an electrically storage type door mirror device (an electrically driven storage type door mirror) is provided. The electrically driven storage type door mirror 1 is equipped at a respective one of the left and right doors of an automobile. It is to be noted that the electrically driven door mirror device of the first exemplary embodiment is equipped at the left side door of the automobile. Hereinafter, a description will be given with respect to the electrically driven storage type door mirror device 1 that is equipped at the left side door of the vehicle. The electrically driven storage type door mirror 1 of the exemplary embodiment is equipped at the right side door of the automobile, and an electrically driven storage type door mirror device that is equipped at the left side door of the automobile is reversed at the left and right from the electrically driven storage type door mirror device 1 of the exemplary embodiment.

In the electrically driven storage type door mirror device 1, as shown in FIG. 1, a mirror assembly 4 is the one that is rotatably mounted on a vehicle body (an automobile door) D via an electrically driven storage unit 3 and a base (a mirror base) 2. The base 2 is the one that is fixed to the door D.

The mirror assembly 4 is made of a mirror housing 5, a mount bracket (not shown), a power unit (not shown), and a mirror (a mirror unit), although not shown. The mount bracket is mounted in the mirror housing 5. The power unit is mounted on the mount bracket. On the power unit, the mirror is mounted to be able to tilt vertically or horizontally.

The electrically driven storage unit 3 is provided with: a shaft holder (a shaft base) 9; a shaft 10; a gear case 11 and a cover 12, a respective one of which serves as a casing; a motor 13; a deceleration mechanism 14 and a clutch mechanism 15, a respective one of which serves as a rotation force transmission mechanism; a bearing member 16; a stopper member 6; a washer 46; a ball 47; an electrically driven rotation range restraining mechanism; a first rotation restraining mechanism; a second rotation restraining mechanism; and a buffering mechanism.

The shaft holder 9 is fixed to the base 2. It is noted that the shaft holder 9 may be integrally provided at the base 2. The shaft 10 is integrally provided at a center of one face (a top face) of the shaft holder 9. It is noted that the shaft 10 is integrally provided at a center of one face (a top face) of the shaft holder 9. The shaft 10 is formed in a hollow shape, and is configured so that a harness (not shown) is inserted through the shaft. On the shaft 10, the gear case 11 and the cover 12 are rotatably mounted around a rotational center O-O of the shaft 10. The mount bracket of the mirror assembly 4 is mounted on the gear case 11. In the gear case 11 and the cover 12, there are housed: the motor 13; the deceleration mechanism 14 and the clutch mechanism 15, a respective one of which serves as the rotation force transmission mechanism; the bearing member 16; the stopper member 6; the washer 46; the ball 47; the electrically driven rotation range restricting mechanism; the first rotation restraining mechanism; the second rotation restraining mechanism; and the buffering mechanism, respectively.

The gear case 11, as shown in FIG. 2, FIG. 6, FIG. 7, and FIG. 8, is formed in a sectional recessed shape of which one side (a lower side) is closed and the other side (an upper side) is opened. In other words, in the gear case 11, there is provided a housing portion 18 formed in a sectional recessed shape of which the side of shaft holder 9 is closed and the side of the cover 12 is opened. An insert hold 19 is provided at a closed portion of the gear case 11. The shaft 10 is inserted into the insert hole 19. As a result, the gear case 11 is rotatably mounted on the shaft 10 so as to be able to rotate around the rotational center O-O of the shaft 10.

As shown in FIG. 2, FIG. 4, FIG. 6, and FIG. 13, an arc-shaped stopper protrusive portion 21 around the rotational center O-O of the shaft 10 is integrally provided on a top face of the shaft holder 9. A stopper face 22 is provided on each end face of the stopper protrusive portion 21, respectively. On the other hand, as shown in FIG. 6, FIG. 7, FIG. 8, and FIG. 13, an arc shaped guide groove 24 around the rotational center O-O of the shaft 10 is provided on a bottom face of the gear case 11. A stopper face 25 is provided on each end face of the guide groove 24.

The stopper protrusive portion 21 of the shaft holder 9 is engaged with the guide groove 24 of the gear case 11. The stopper protrusive portion 21 and the guide groove 24 configure a guide member serve as a guide when the gear case 11 rotates around the rotational center O-O of the shaft 10 relative to the shaft holder 9, in other words, as shown in FIG. 1, when the mirror assembly 4 rotates between a use location A and a storage location B relative to the base 2 and between the use location A and a forward tilting location C backward (in the clockwise direction seen from the top) or forward (in the counterclockwise direction seen from the top). In FIG. 1, reference uppercase letter C designates a forward tilt location of the mirror assembly 4, reference uppercase letter E designates a backside of a vehicle and reference uppercase letter F designates a foreside of the vehicle.

Figure 13:
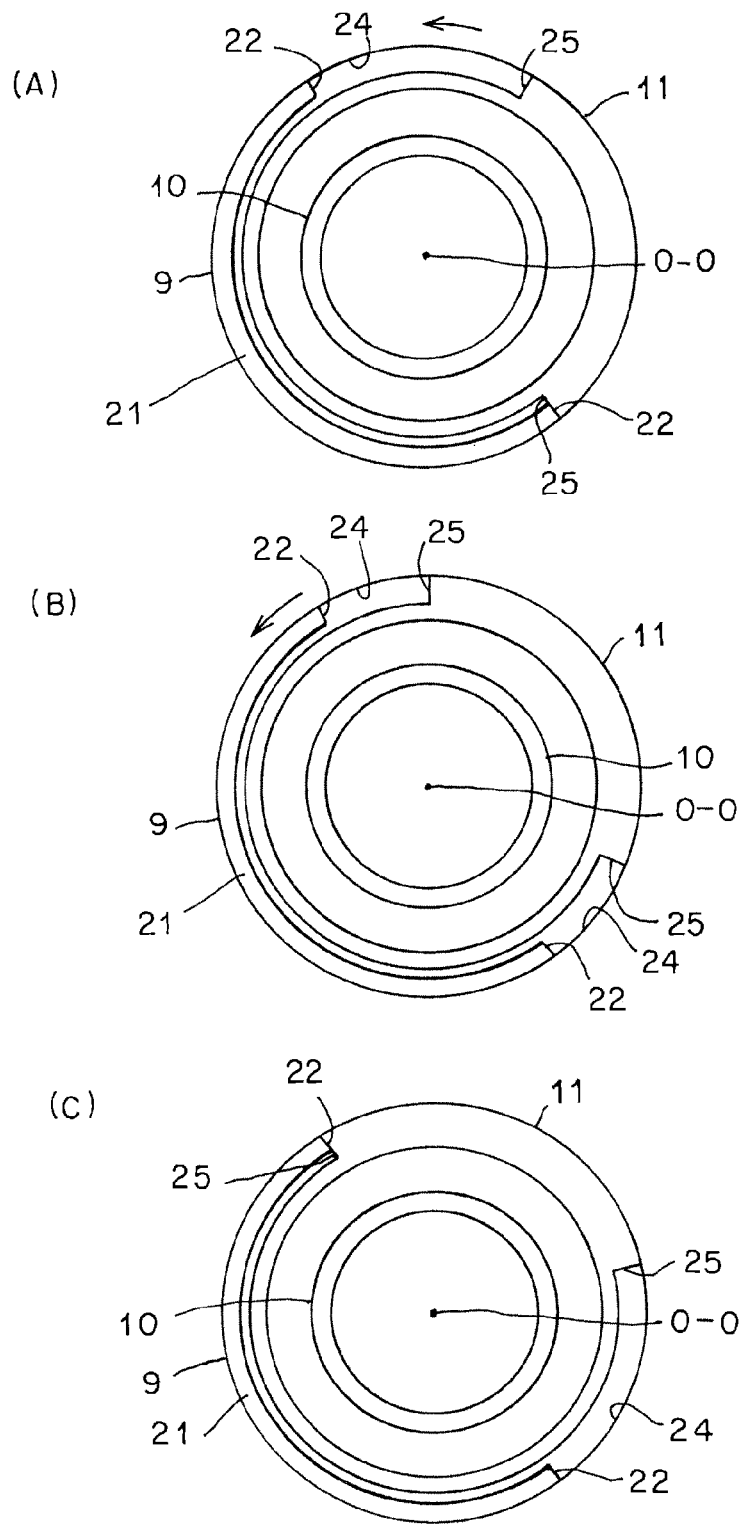
FIG. 13 is an explanatory plan view showing a state in which an electrically driven rotation range restraining mechanism is actuated, similarly.

In addition, the stopper face 22 of the stopper protrusive portion 21 and the stopper face 25 of the guide groove 24 configure the electrically driven rotation range restraining mechanism for restraining a range α of the electrically driven rotation of the mirror assembly 4 (the range between the use location A and the storage location B shown in FIG. 1). In other words, as shown in FIG. 13 (A), if the mirror assembly 4 is positioned in the use location A, the stopper face 22 that is one face of the stopper protrusive portion 21 and the stopper face 25 that is one face of the guide groove 24 abut against each other. In addition, as shown in FIG. 13 (C), if the mirror assembly 4 is positioned in the storage location B, the stopper face 22 that is the other face of the stopper protrusive portion 21 and the stopper face 25 that is the other face of the guide groove 24 abut against each other.

Figure 2:
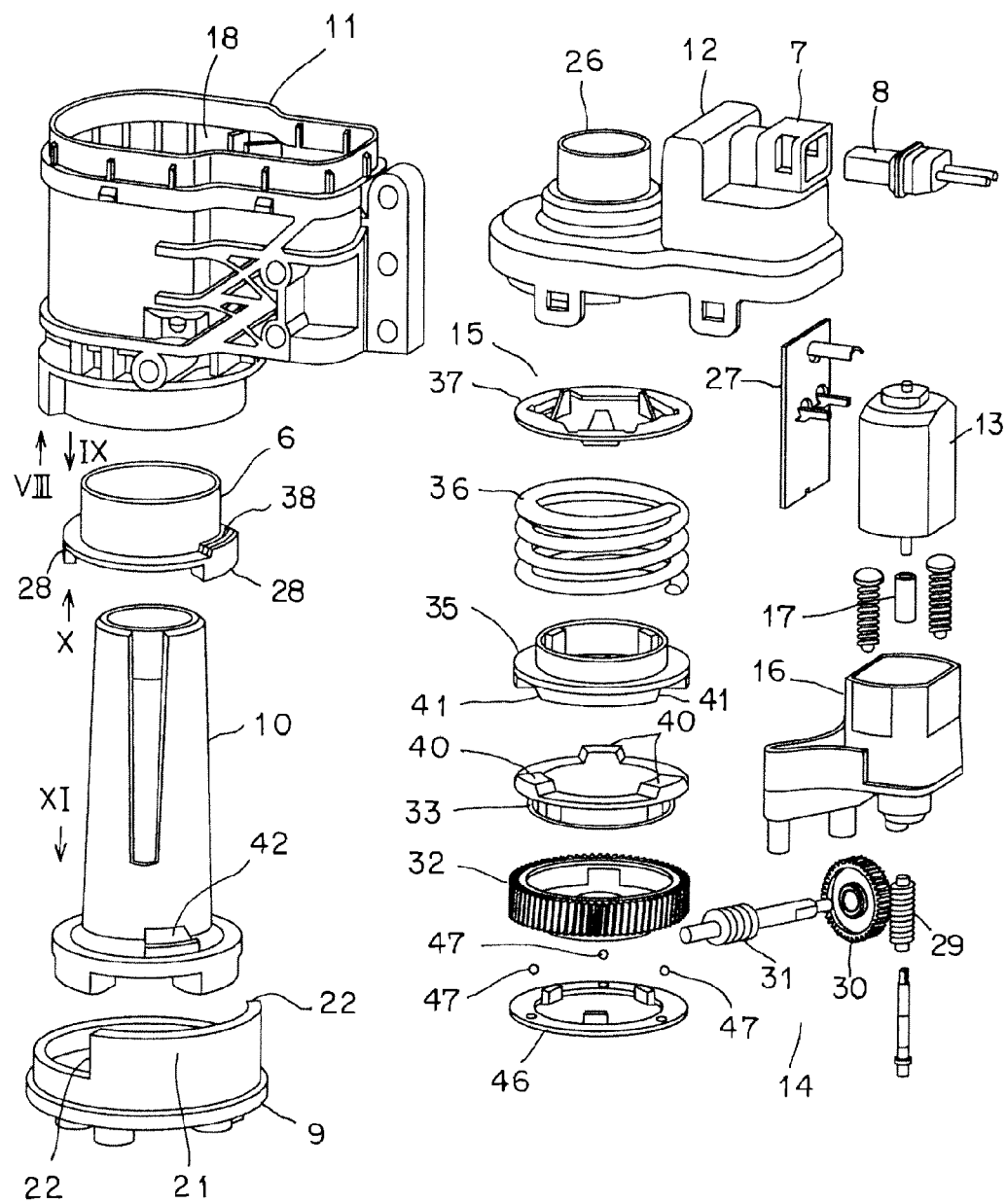
FIG. 2 is an exploded perspective view showing an electrically driven storage unit, similarly.
Figure 3:
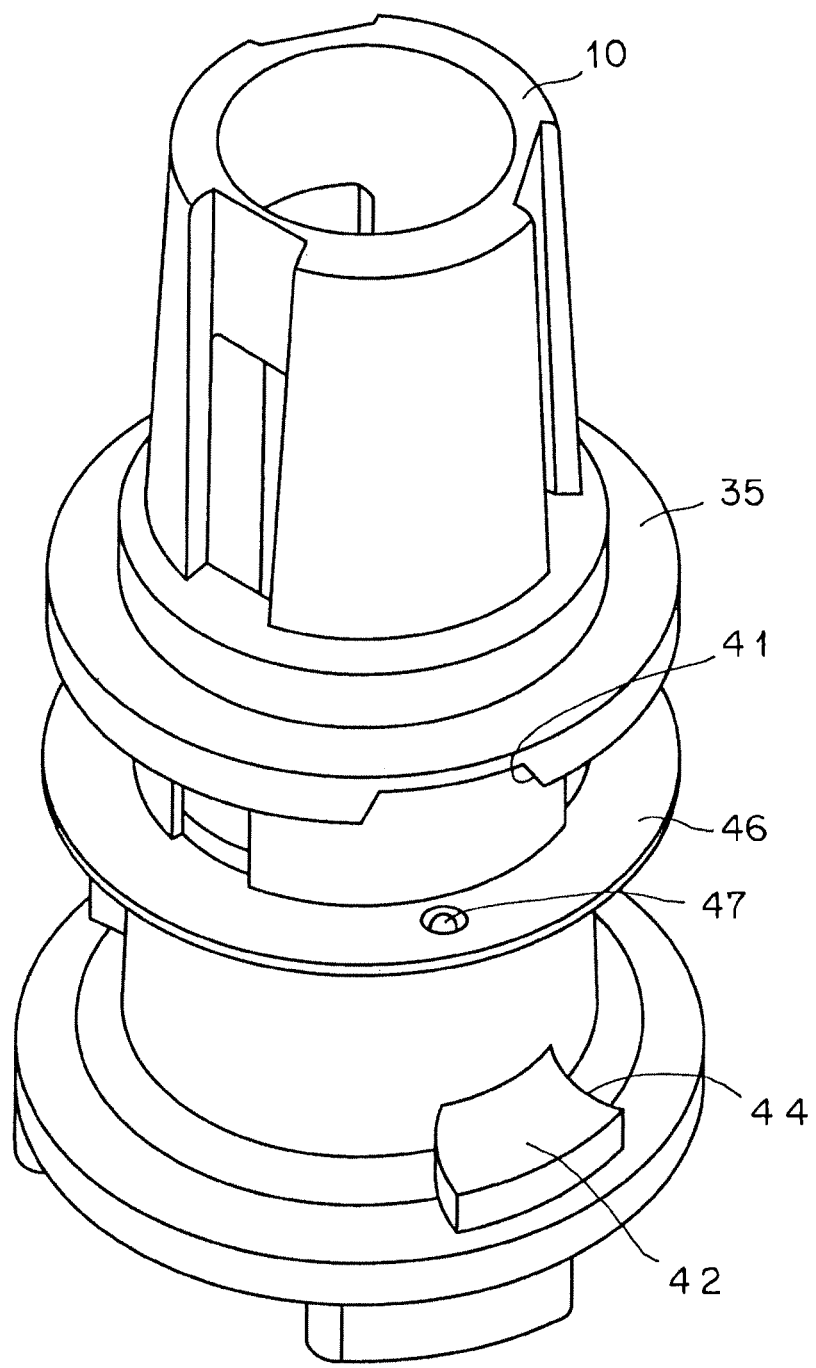
FIG. 3 is a perspective view showing a state in which a shaft, a clutch holder, and a washer are assembled in all, similarly.
Figure 4:
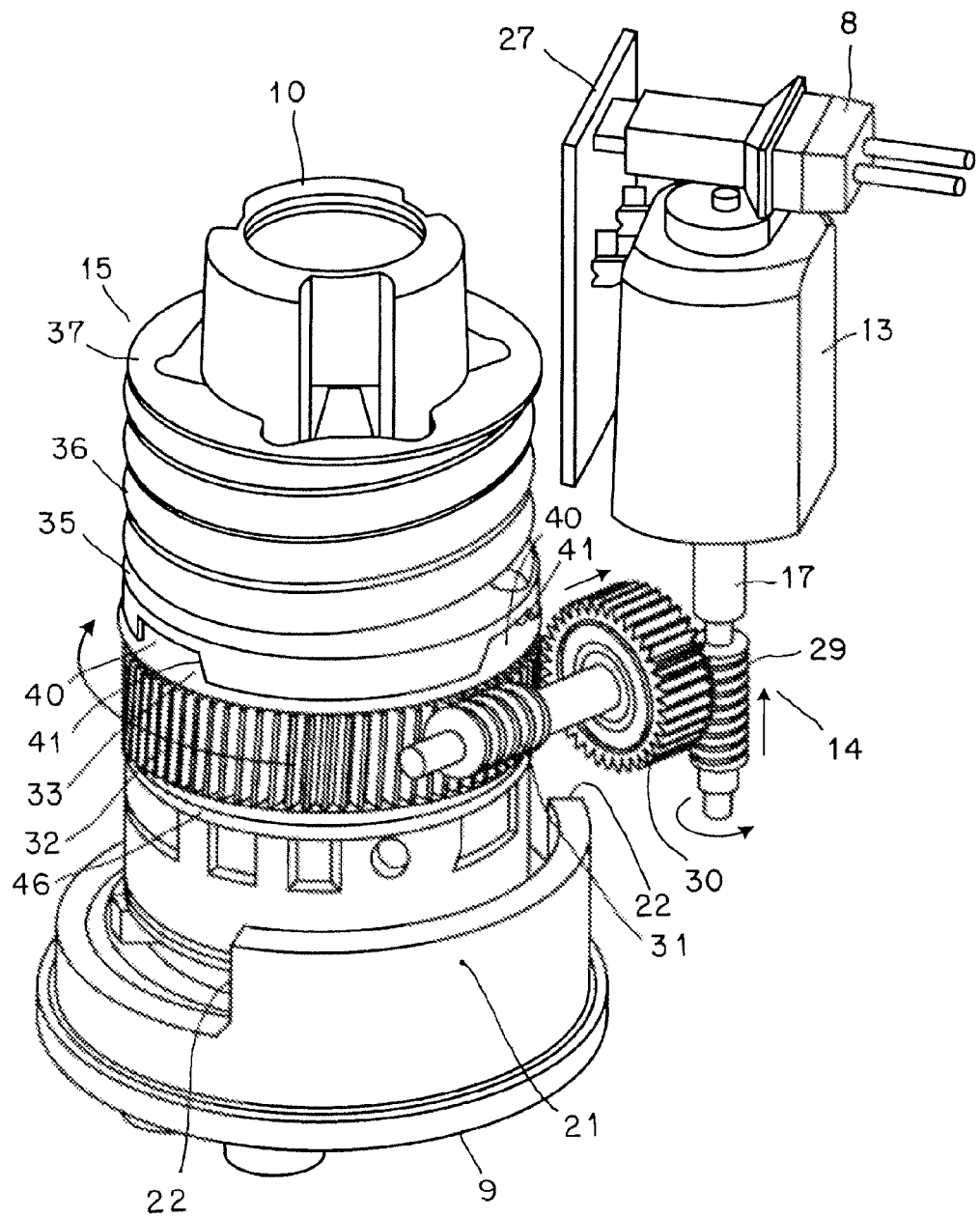
FIG. 4 is a perspective view showing a state in which the electrically driven storage unit other than a casing is assembled, similarly.

The cover 12, as shown in FIG. 2, is formed in a sectional inverted recessed shape of which one side (an upper side) is closed and the other side (a lower side) is opened. In other word, on the cover 12, there is provided a housing portion 18 formed in a sectional inverted recessed shape of which one side, i.e., the side of the gear case 11 is opened and the other side is opened. On the cover 12, a harness insert cylinder portion 26 which communicates with the shaft 10 that is formed in a hollow shape is integrally provided.

In addition, a socket portion 7 is provided at the cover 12. On the socket portion 7, a connector 8 which is electrically connected to a power supply (a battery) side, although not shown, electrically intermittently connects thereto and is mounted in a mechanically detachable manner. A board 27 is mounted on the socket portion 7. The board 27 is electrically connected to the motor 13. A switch circuit for controlling the drive or stoppage of the motor 13 is packaged on the hoard 27. As a result, the motor 13 is electrically connected to the connector 8 via the board 27 and the socket portion 7.

The cover 12 is engagingly fixed to the outside of an opening rim of the housing portion 18 of the gear case 11. In the housing portion 18 inside the gear case 11 and the cover 12, the motor 13, the deceleration mechanism 14, the clutch mechanism 15, the bearing member 16, the stopper member 6, the washer 46, the ball 47, the electrically driven rotation range restricting mechanism, the first rotation restraining mechanism, the second rotation restraining mechanism, the buffering mechanism, and the board 27 are fixedly housed by means of screws or the like.

In addition, on the cover 12, an insert hole (not shown) is provided so as to communicate with the harness insert cylinder portion 26. The shaft 10 is inserted into the insert hole. As a result, the cover 12 is mounted on the shaft 10, together with the gear case 11, so as to be rotatable around the rotational center O-O of the shaft 10.

Figure 6:
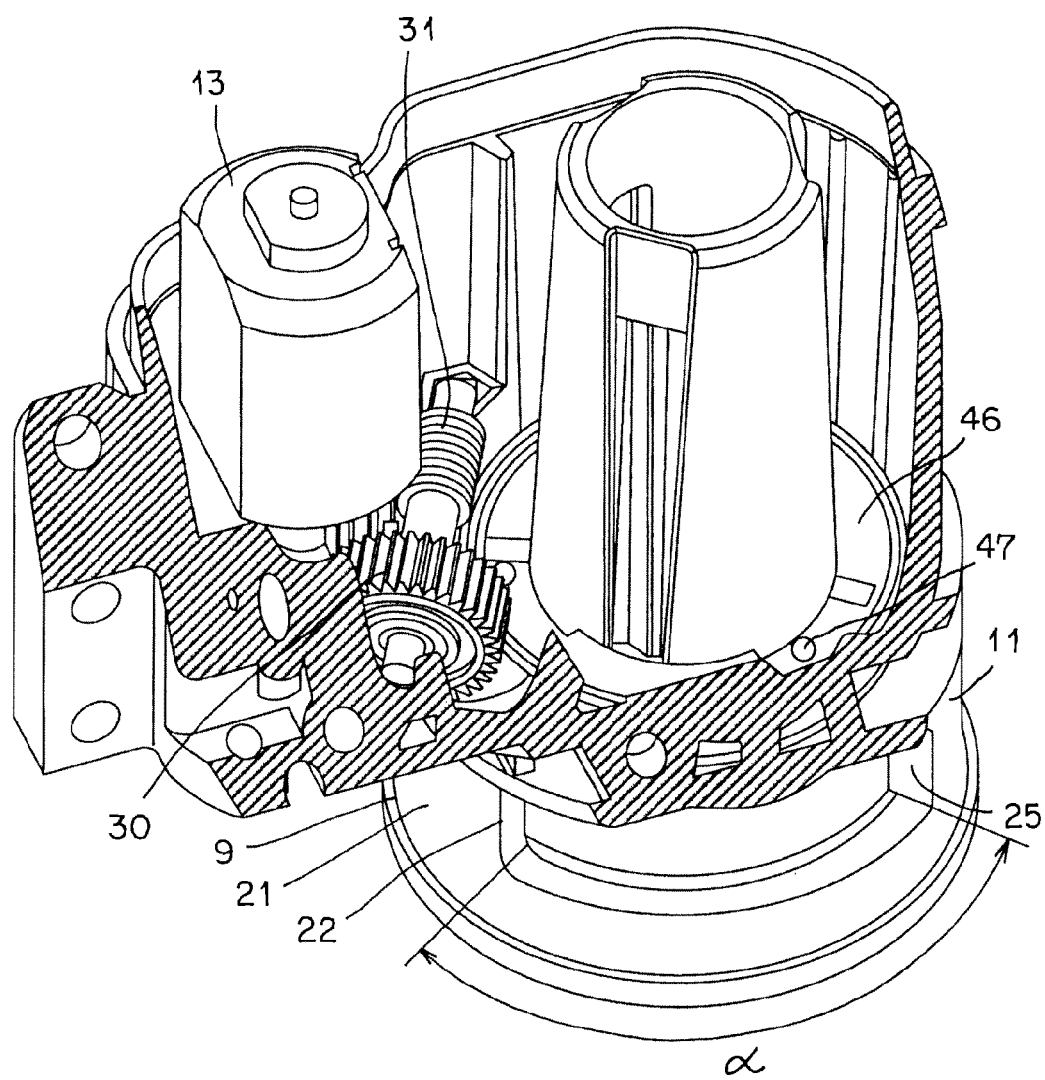
FIG. 6 is a perspective view showing a state in which the electrically driven storage unit is assembled in a case where a part of the casing is eliminated therefrom, similarly.
Figure 7:
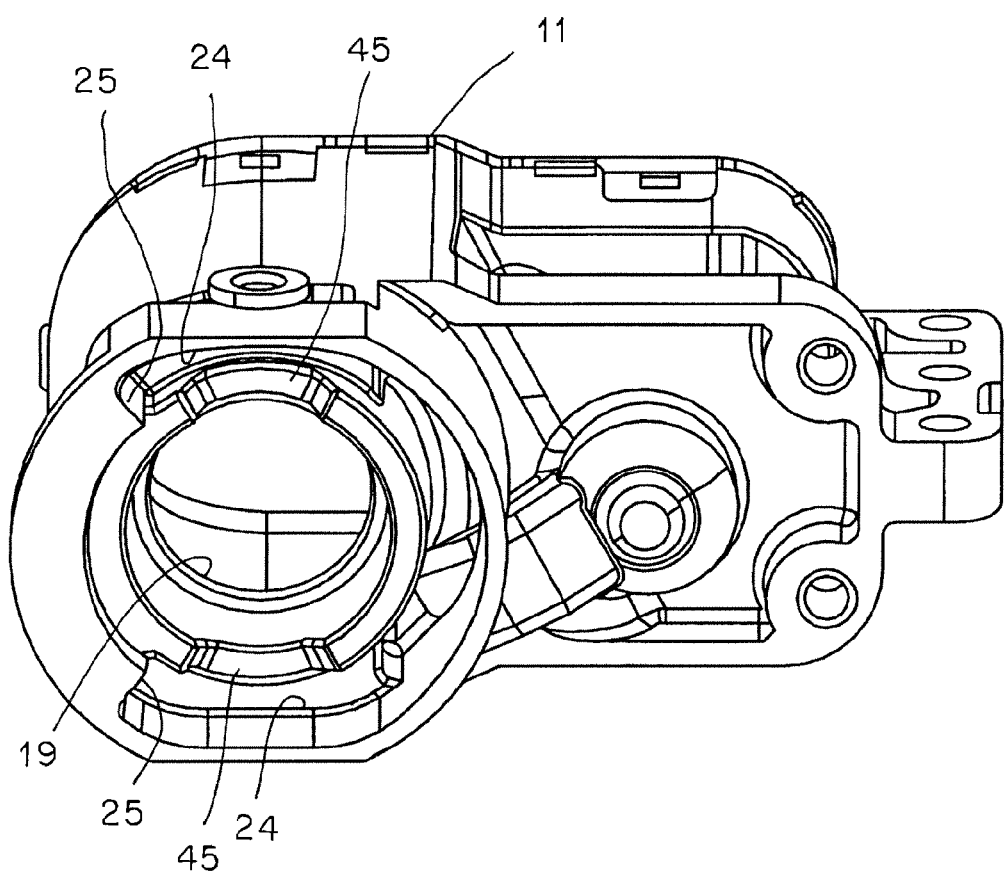
FIG. 7 is a perspective view showing a state in which the casing is seen from a lower oblique side, similarly.
Figure 8:
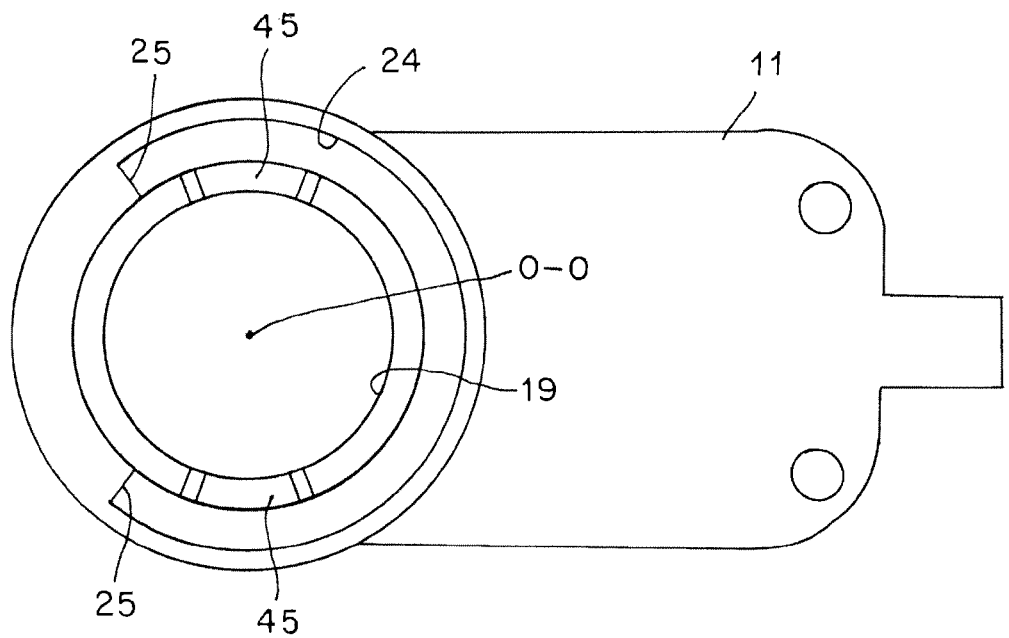
FIG. 8 is a view taken along the line VIII in FIG. 2, the view showing a bottom face of the casing, similarly.
Figure 9:
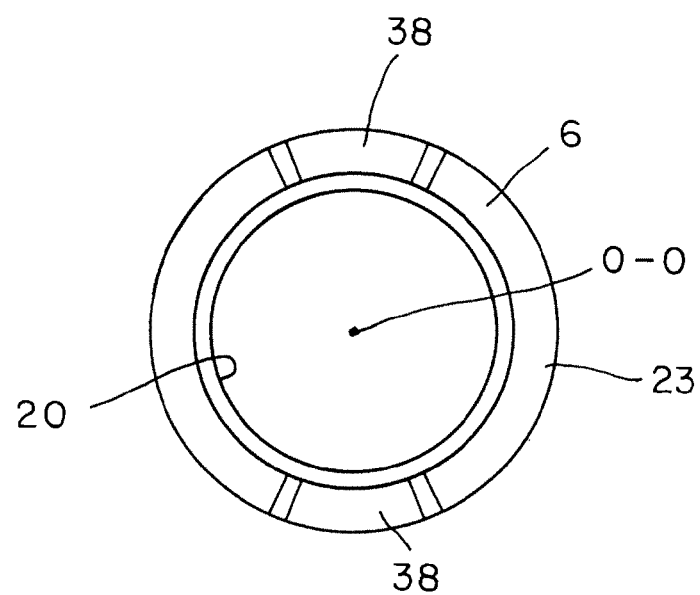
FIG. 9 is a view taken along the line IX in FIG. 2, the view showing a flat face of a stopper member, similarly.

The deceleration mechanism 14 and the clutch mechanism 15, a respective one of which serves as the rotation force transmission mechanism, as shown in FIG. 2 and FIG. 6, are the ones that are housed in the housing portion 18 of the gear case 11 and the cover 12, that are provided between an output shaft (not shown) and the shaft 10, of the motor 13, and that transmit a rotation force of the motor 13 to the shaft 10. The motor 13, the deceleration mechanism 14, and the clutch mechanism 15, a respective one of which serves as the rotation force transmission mechanism, are the ones that are electrically driven relative to the shaft 10 to rotate the mirror assembly 4 around the rotational center O-O of the shaft 10.

The deceleration mechanism 14 is comprised of: a first worm gear 29 which serves as a first step gear; a helical gear 30 which serves as a second step gear engaging with the first worm gear 29; a second worm gear 31 which serves as a third step gear; and a clutch gear 32 which serves as a final step gear with which the second worm gear 31 engages.

The first worm gear 29 is rotatably borne on the gear case 11 and the bearing member 16. The first worm gear 29 is linked with an output shaft of the motor 13 via a joint 17. The helical gear 30 is rotatably borne on the bearing member 16. The second worm gear 31 is rotatably borne on the gear case 11 and the bearing member 16. The cal gear 30 and the second worm gear 31 are linked with each other in an integrally rotatable manner.

The clutch mechanism 15 is provided with the clutch gear 32, a clutch 33, a clutch holder 35, a spring 36, and a push nut 37. The clutch mechanism 15 is configured by sequentially engaging the clutch gear 32, the clutch 33, the clutch holder 35, and the spring 36 with the shaft 10, locking the push nut 37 with the shaft 10, and then, establishing the spring 36 in a compressed state. The clutch gear 32 and the clutch 33 are fixed to each other around the rotational center O-O of the shaft 10. The clutch 33 and the clutch holder 35 are linked with each other in an intermittently connectable manner. The second worm gear 31 of the deceleration member 14 and the clutch gear 32 of the clutch mechanism 15 engage with each other, whereby a rotation force of the motor 13 is transmitted to the shaft 10.

The clutch gear 32, the clutch 33, and the clutch holder 35 configure the clutch mechanism 15. The clutch gear 32 and the clutch 33 are mounted on the shaft 10 so as to be rotatable around the rotational center O-O of the shaft 10 and to be movable in an axial direction. The clutch holder 35 is mounted on the shaft 10 in such an engaged state as to disable rotation and as to be movable in an axial direction. As shown in FIG. 2, FIG. 4, and FIG. 14 to FIG. 20, a plurality of, i.e., three mountain-shaped clutch protrusive portions 40 and three valley-shaped clutch portions 41 are provided at equal intervals on a face which is mutually opposite to the clutch 33 and the clutch holder 35, i.e., on one face (an upper face) side of the clutch 32 and one face (a bottom face) side of the clutch holder 35. When the clutch protrusive portion 40 and the clutch recessed portion 41 are established in an engaged state, the clutch gear 32, the clutch 33, and the clutch holder 35 are in a continuous state (a non-disengaged state or a connected state); or when the clutch protrusive portion 40 and the clutch recessed portion 41 are in a disengaged state, the clutch gear 32, the clutch 33, and the clutch holder 35 are in a discontinuous state (an disengaged state or a disconnected state). The clutch mechanism 15 is not disengaged from an electrically driven rotation force of the motor 13 and the rotation force transmission mechanism (the deceleration mechanism 14 and the clutch mechanism 15), and is disengaged therefrom with the use of a force which is greater than the electrically driven rotation force so as to be able to rotate the mirror assembly 4 relative to the shaft 10.

Among the clutch members, the other face (a bottom face) side of the clutch gear 32 and the clutch 33 abut against one face (a top face) of a bottom part of the gear case 11 directly or via a washer (not shown). On the other hand, among the clutch members, the other face (a top face) side of the clutch holder 35 directly abuts against the spring 36. Recessed portions 39 and 43 for the ball 47 that is to be withdrawn are respectively provided on one face (a top face) of the gear case 11 and the other face (a bottom face) of the clutch gear 32. The recessed portions 39 and 43 each have a predetermined width around the rotational center O-O of the shaft 10, in other words, a width of setting a time difference for displacing the peaks in torque.

The washer 46 is made of a metal member, for example, an iron plate. The washer 46 is mounted on the shaft 10 in such an engaged state as to disable rotation and to disable movement in an axial direction. The washer 46 is interposed between the other face (a bottom face) of the clutch gear 32 and the clutch 33 and one face (a top face) of a bottom part of the gear case 11.

Figure 5:
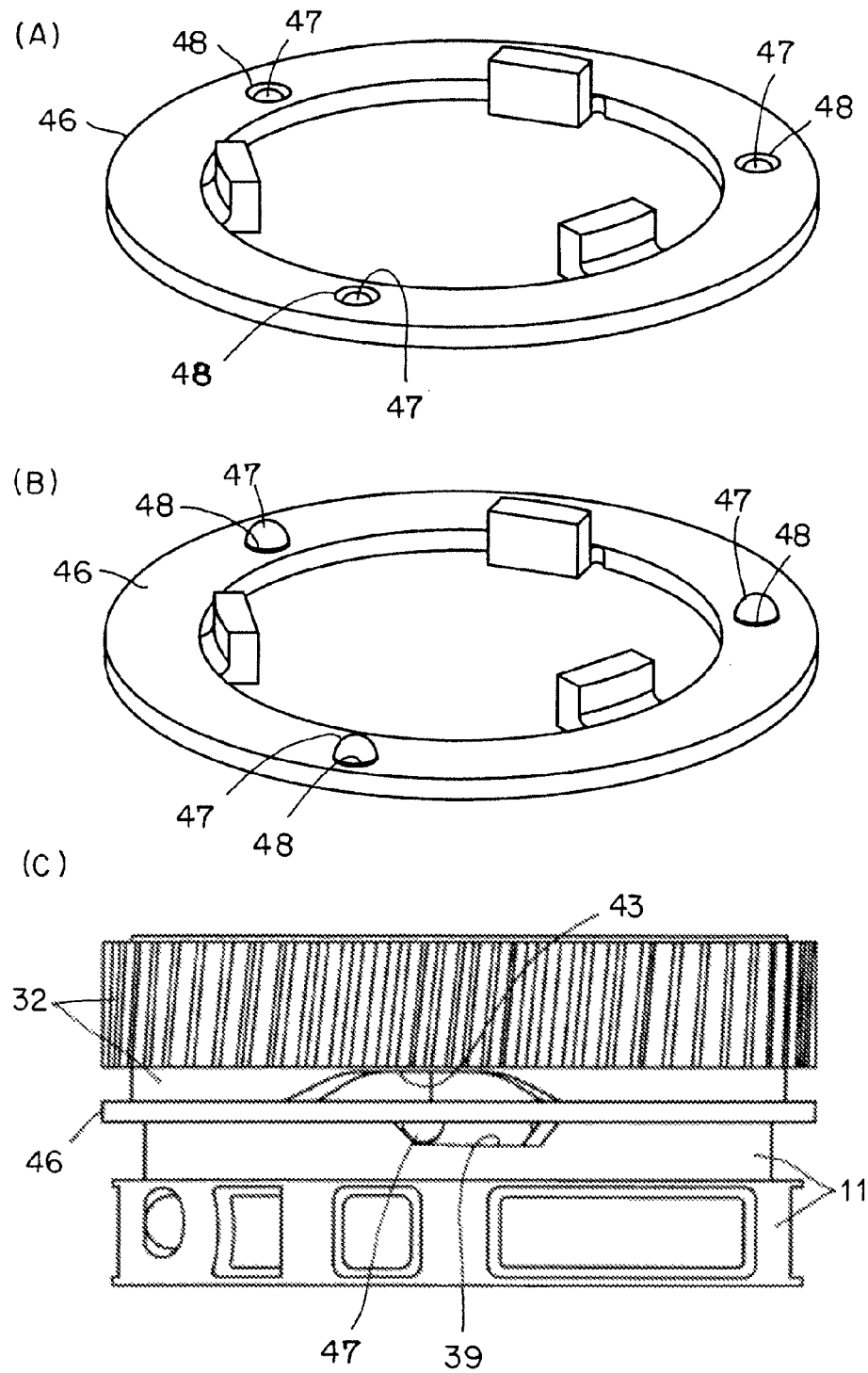
FIG. 5 is an explanatory view showing a state in which a first rotation mechanism is actuated, similarly.

As shown in FIG. 5 (A), FIG. 5 (B), and FIG. 5 (C), in the washer 46, three holes 48 are provided at equal intervals. The ball 47 is loosely engaged with a respective one of the holes 48. In other words, the ball 47 is movable in a vertical direction relative to the washer 46 (in the direction of the rotational center O-O of the shaft 10). It is to be noted that FIG. 5 (A) and FIG. 5 (C) show a state in which the ball 47 drops by its own weight, and FIG. 5 (B) shows a state in which the ball 47 is pushed up on a tilt face.

When the mirror assembly 4 is positioned in the use location A, the ball 47 drops in the recessed portion 39 of the gear case 11, and abuts against one tilt face of the recessed portion 39. Such one tilt face of the recessed portion 39 of the gear case 11 and the ball 47 configure a first rotation restraining mechanism adapted to restrain rotation to the storage location B of the mirror assembly 4 that is positioned in the use location A and to allow for rotation to the storage location B of the mirror assembly 4 that is disengaged with the electrically driven rotation force (with the ball 47 traveling over one tilt face of the recessed portion 39) and then is positioned in the use location A.

Figure 10:
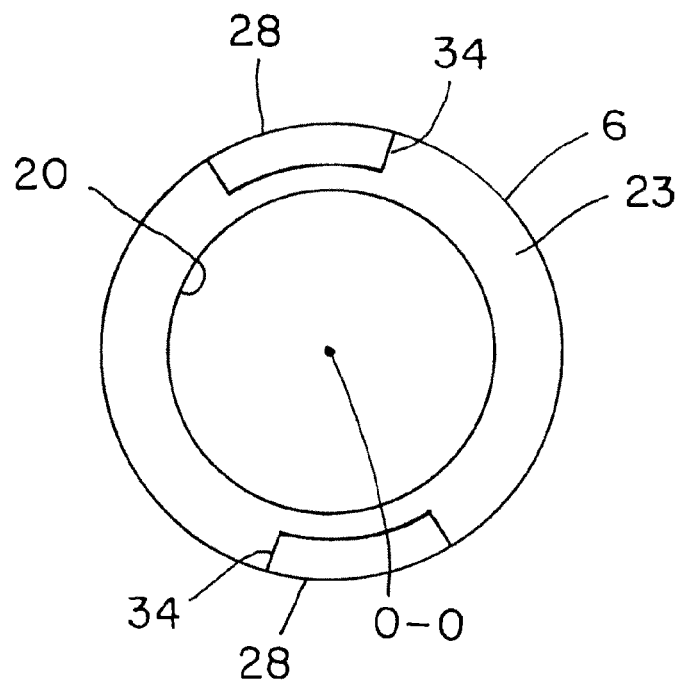
FIG. 10 is a view taken along the line X in FIG. 2, the view showing a bottom face of the stopper member, similarly.

The stopper member 6 is provided between the shaft holder 9 and the gear case 11. The stopper member 6 is made of an inexpensive resin member with its low friction property and wear and abrasion resistance, for example, POM (polyacetal or acetal resin) or PPS (polyphenylene sulfide). The stopper member 6 has an insert hole 20 into which the shaft 10 is to be inserted, and is formed in a hollow-like cylindrical shape having a jaw portion 23 on one end part (a lower end part). The stopper member 6 is rotatably mounted on the shaft around the rotational center O-O of the shaft 10. As shown in FIG. 2 and FIG. 10, on one face (a bottom face) of the jaw portion 23 of the stopper member 6, two arc-shaped protrusive portions 28 around the rotational center O-O of the shaft 10 are integrally provided at equal intervals. The arc-shaped protrusive portion 28 and an abutment face 34 that is one end face of the arc-shaped protrusive portion 28 configure the second rotation restraining mechanism. In addition, on the other face (a top face) of the jaw portion 23 of the stopper member 6, one or more, in this example, two trapezoidal gear protrusive portions 38, a respective one of which serve as a gear portion of the buffer mechanism, are integrally provided on a circumference around the rotational center O-O of the shaft 10.

Figure 11:
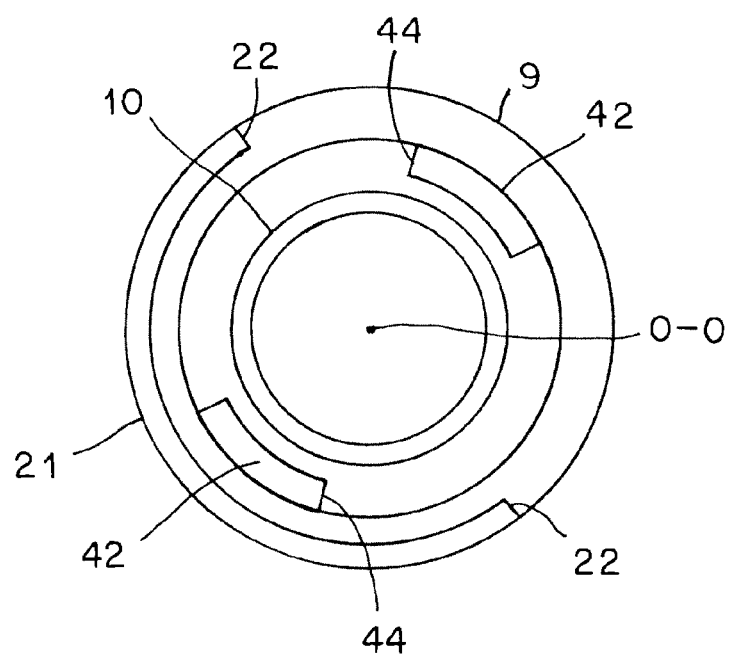
FIG. 11 is a view taken along the line XI in FIG. 2, the view showing a flat face of a shaft holder, similarly.

The shaft holder 9 and the shaft 10 are comprised of a member with its high rigidity, for example, a die cast or a resin. As shown in FIG. 2 and FIG. 11, on a top face of the shaft 10, two arc-shaped protrusive portions 42 around the rotational center O-O of the shaft 10 are integrally provided at equal intervals in correspondence with the arc-shaped protrusive portion 28 of the stopper member 6. On one end face of the arc-shaped protrusive portion 42, an abutment face 44 is provided in correspondence with the abutment face 34 of the stopper member 6. The arc-shaped protrusive portion 42 and the abutment face 44 configure the second rotation restraining mechanism, as is the case with the arc-shaped protrusive portion 28 and the abutment face 34 of the stopper member 6.

The second rotation restraining mechanism is a mechanism in which the abutment face 34 of the arc-shaped protrusive portion 28 of the stopper member 6 abuts against the abutment face 44 of the arc-shaped protrusive portion 42 of the shaft 10, thereby restraining rotation of the forward tilt location C of the mirror assembly 4 that is positioned in the use location A.

The gear case 11 is comprised of a member with its high rigidity, for example, a resin containing nylon or a glass fiber or a carbon fiber. On the other face (a bottom face) of a bottom part of the gear case 11, a plurality of, and in this example two trapezoidal engagement recessed portions 45 that serve as engagement portions of the buffering mechanism are integrally provided at equal intervals in correspondence with the gear protrusive portions 38 of the stopper member 6 on a circumference around the rotational center O-O of the shaft 10.

The buffering mechanism is a mechanism in which if a force other than the electrically driven rotation face (a manually driven force or a force that is exerted in a case where something hits against the mirror assembly 4), which is a force of a predetermined value or more, is applied to the mirror assembly 4 that is positioned in the use location A, in a direction from the use location A to the forward tilt location C, the gear protrusive portion 38 of the stopper member 6 and the gear recessed portion 45 of the gear case 11 are disengaged from each other, as a result, allowing for rotation to the forward tilt location C of the mirror assembly 4 that is positioned in the use location A.

[Description of Function]

The electrically driven storage type door mirror device 1 in the first exemplary embodiment is made of the constituent elements as described above, and hereinafter, its related functions will be described. As described previously, the electrically driven storage type door mirror device 1 in the first exemplary embodiment is equipped at the left side door of an automobile. A function of an electrically driven storage type door mirror device to be equipped at the right side door of the automobile is substantially reversed at the left and right in comparison with that of the electrically driven storage type door mirror device 1 of the first exemplary embodiment; and therefore, a description thereof is omitted herein. It is to be noted that in FIG. 14 to FIG. 21, a shaft holder 9, a clutch mechanism 15, and a spring 36 are not shown.

As shown in FIG. 1, with reference to FIG. 15, a description will be given with respect to a case in which a mirror assembly 4 that is positioned in a use location A is electrically driven to be rotated and stored in a storage location B of a rear E of a vehicle. When the mirror assembly 4 is positioned in the use location A (in a set state or in a use state), a clutch mechanism 15 is established in a state shown in FIG. 14 and FIG. 15 (A), an electrically driven rotation range restraining mechanism is established in a state shown in FIG. 13 (B), a first rotation restraining mechanism is established in a state in FIG. 14 and FIG. 15 (A), a second rotation restraining mechanism is established in a state shown in FIG. 12 (A) and FIG. 15, and a buffering mechanism is established in a state shown in FIG. 14 and FIG. 15 (A).

In other words, the electrically driven rotation range restraining mechanism, as shown in FIG. 13 (B), is established in a state in which each stopper face 22 of a stopper protrusive portion 21 of a shaft holder 9 is in noncontact with each stopper face 25 of a guide groove 24 of a gear case 11. Thus, the mirror assembly 4 is positioned in the use location A, allowing for a rotation to a storage location B (and a rotation to a forward tilt location C).

Figure 14:
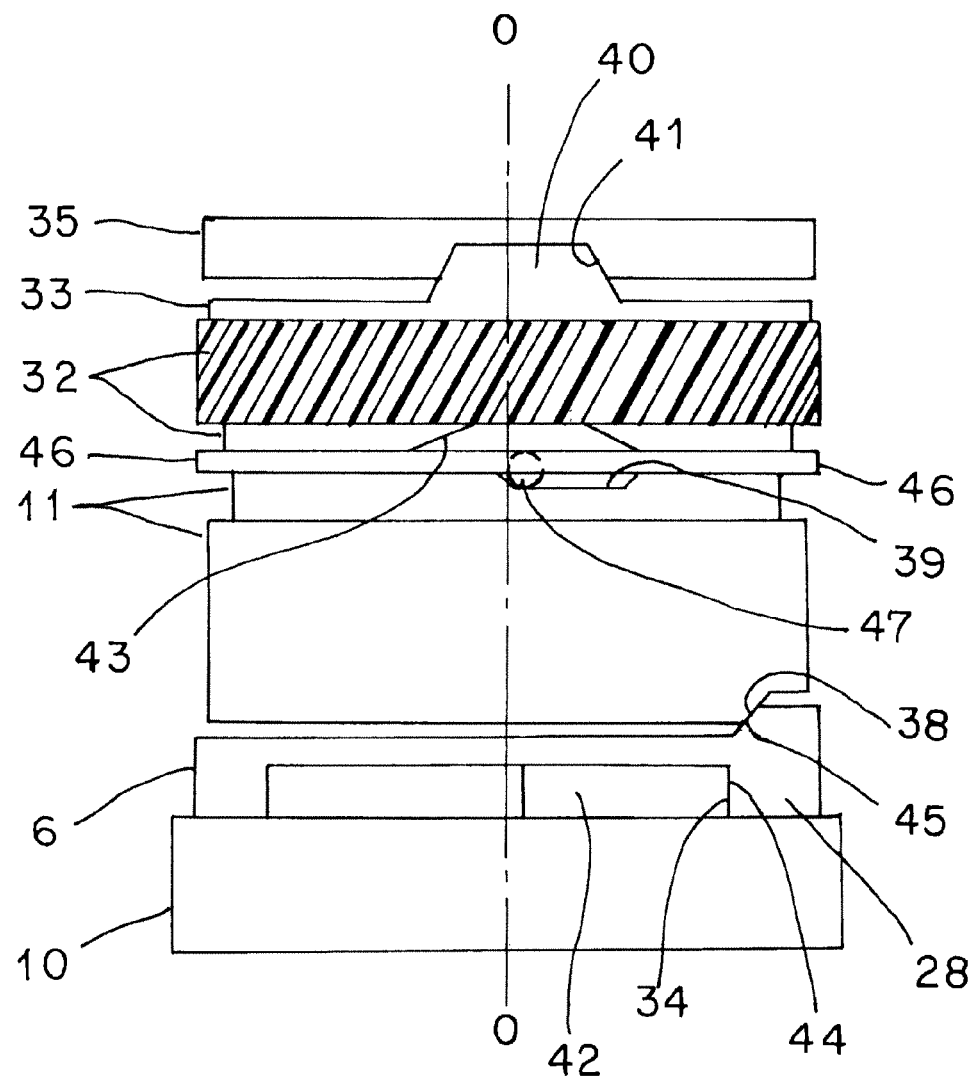
FIG. 14 is an explanatory view showing a state in which a clutch mechanism, a first rotation restraining mechanism, the second rotation restraining mechanism, and a buffering mechanism are assembled in all, similarly.
Figure 15:
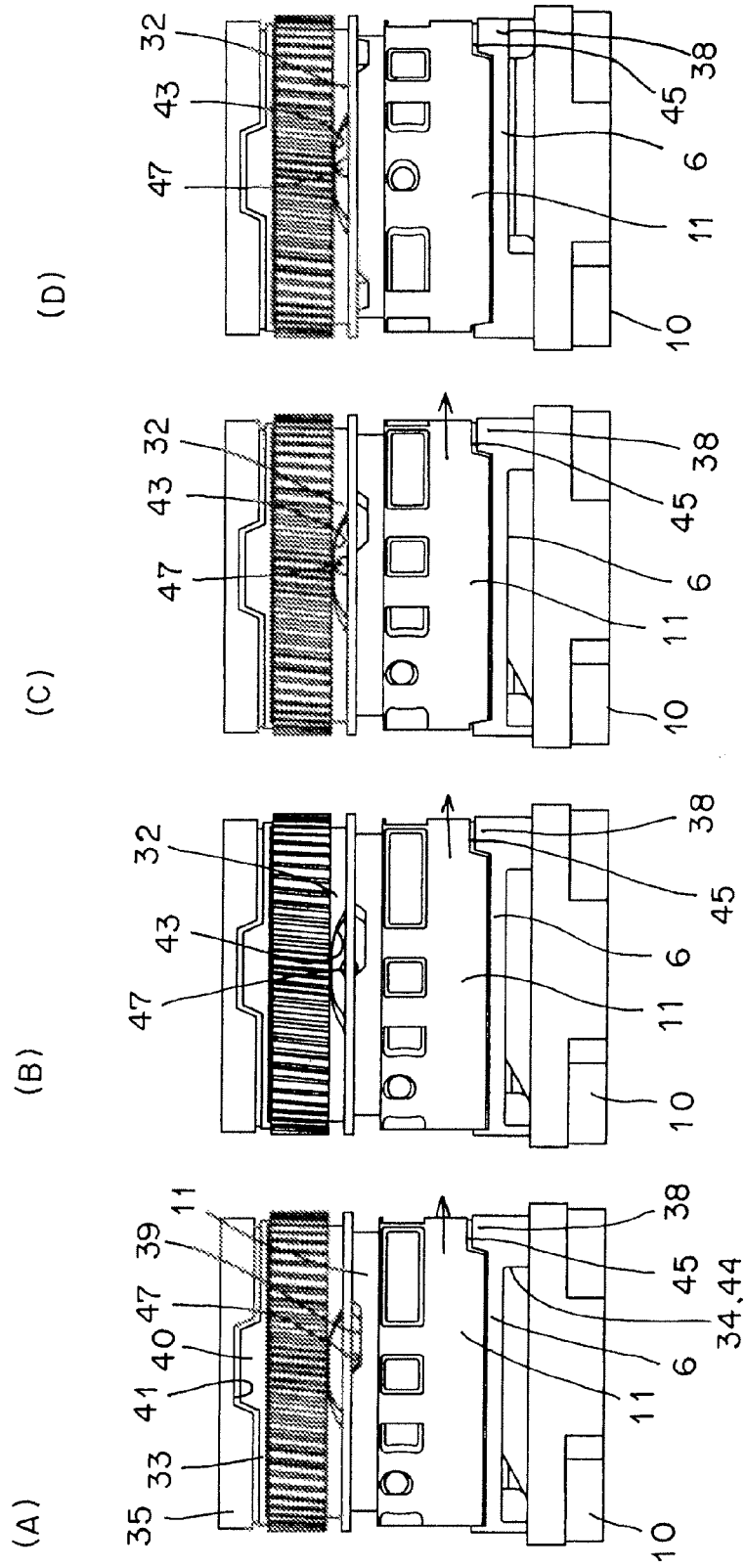
FIG. 15 is an explanatory view showing a state in which the clutch mechanism, the first rotation restraining mechanism, the second rotation restraining mechanism, and the buffering mechanism are assembled in all when a mirror assembly that is positioned in a use location is positioned in a storage location in an electrically driven manner, similarly.

In contrast, in the clutch mechanism 15, as shown in FIG. 14 and FIG. 15 (A), a clutch protrusive portion 40 of a clutch 33 and a clutch recessed portion 41 of a clutch holder 35 are engaged with each other, and thus, a clutch gear 32 and the clutch 33 and the clutch holder 35 are established in a continuous state. Thus, the clutch gear 32 and the clutch 33 are established in a rotation disable state relative to a shaft 10 together with the clutch holder 35.

In addition, in the buffering mechanism, as shown in FIG. 14 and FIG. 15 (A), a gear protrusive portion 38 of the stopper mechanism 6 and a gear recessed portion 45 of the gear case 11 are established in a state in which these portions are geared with each other. As a result, the stopper member 6 and the gear case 11 are established in a state in which they are integrated with each other.

Figure 12:
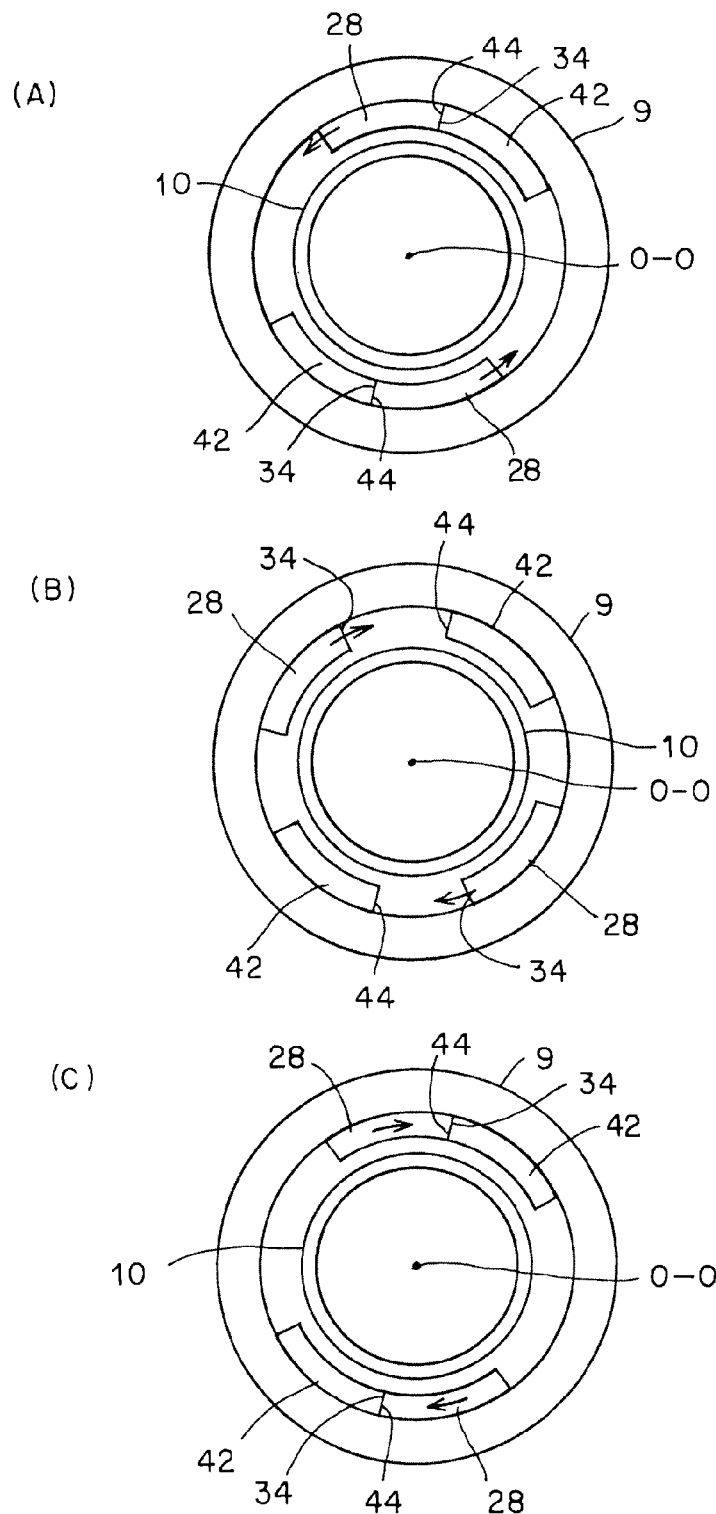
FIG. 12 is an explanatory plan view showing a state in which a second rotation restraining mechanism is actuated, similarly.

Further, in the second rotation restraining mechanism, as shown in FIG. 12 (A) and FIG. 15(A), an abutment face 34 of an arc-shaped protrusive portion 28 of the stopper member 6 are established in a state of abutment against an abutment face 44 of an arc-shaped protrusive portion 42 of the shaft 10.

As a result, a rotation to the storage location B and a rotation to the forward tilt location C of the mirror assembly 4 that is positioned in the use location A are respectively restrained.

In this set state (a use state) of FIG. 15 (A), a switch (not shown) in an automobile room is operated and then power is fed to a motor 13 via a connector 8, a socket portion 7, and a board 27 so as to thereby drive the motor 13. Then, a rotation force of the motor 13 is transmitted to the clutch gear 32 that is fixed to the shaft 10 via an output shaft and a deceleration mechanism 14. At this time, the clutch gear 32 and the clutch 33 are established in a state in which a rotation is disabled relative to the shaft 10, together with the clutch holder 35; and therefore, a second worm gear 31 of the deceleration mechanism 14 is about to rotate around a rotational center O-O of the shaft 10 with the clutch gear 32 serving as a fixing gear. Its relevant rotation force is transmitted to the gear case 11 of the electrically driven storage unit 3. As a result, the mirror assembly 4 having the electrically driven storage unit 3 incorporated therein, as shown in FIG. 1, is about to rotate in the counterclockwise direction seen from a top side, from a use location A to a storage location B around the rotational center O-O of the shaft 10.

As shown in FIG. 15 (A), if the gear case 11 is rotated in the direction indicated by the arrow (in the counterclockwise direction with an electrically driven rotation force, the ball 47 that abuts against one tilt face of the recessed portion 39 of the gear case 11 is pushed up by a tilt face of the recessed portion 39 of the gear case 11. At this time, as shown in FIG. 15 (B) and FIG. 15 (C), a recessed portion 43 is provided at a clutch gear 32 that is positioned on the ball 47, so that the ball 47 can be pushed up without a need to apply a load. As a result, at the time of actuation of electrically driven storage, actuation of electrically driven storage can be performed without an increase in load.

The stopper member 6 that is integrated with the gear case 11 via the gear protrusive portion 38 and the gear recessed portion 45 also rotates in the direction indicated by the arrow, and as shown in FIG. 12 (A) and FIG. 12 (B), the abutment face 34 of the arc-shaped protrusive portion 28 of the stopper member 6 is spaced from the abutment face 44 of the arc-shaped protrusive portion 42 of the shaft 10. On the other hand, as shown in FIG. 13, the other stopper face 25 of the guide groove 24 of the gear case 11 abuts against the other stopper face 22 of the stopper protrusive portion 21 of the shaft holder 9, as shown in FIG. 13 (C) from the state of FIG. 13 (B). As a result, as shown in FIG. 15 (D), the gear case 11 abuts against the shaft holder 9, and a rotation of the gear case 11 stops.

At the same time, a value of a current (an actuation current) supplied to a motor 13 rises and reaches a predetermined value, a switch circuit of a board 27 is actuated, and then, power supply to the motor 13 is interrupted. As a result, the mirror assembly 4 moves from the use location A to the storage location B shown in FIG. 1 and then stops and is positioned therein.

In a case where the mirror assembly 4 that is positioned in the storage location B is restored (returned) to the use location A in an electrically driven manner, the sequential order of the actuation is reversed; and therefore, a description is omitted herein.

As shown in FIG. 1, with reference to FIG. 16, a description will be given with respect to a case in which the mirror assembly 4 that is positioned in the storage location B is rotated to the use location A in a manually driven manner.

The clutch holder 35, the washer 46, and the ball 47 are fixed to each other in a rotational direction relative to the shaft 10, so that they do not rotate around the rotational center O-O of the shaft 10. On the other hand, the clutch gear 32 and the clutch 33, when they are actuated in a manually driven manner, rotate around the rotational center O-O of the shaft 10 together with the gear case 11.

Figure 16:
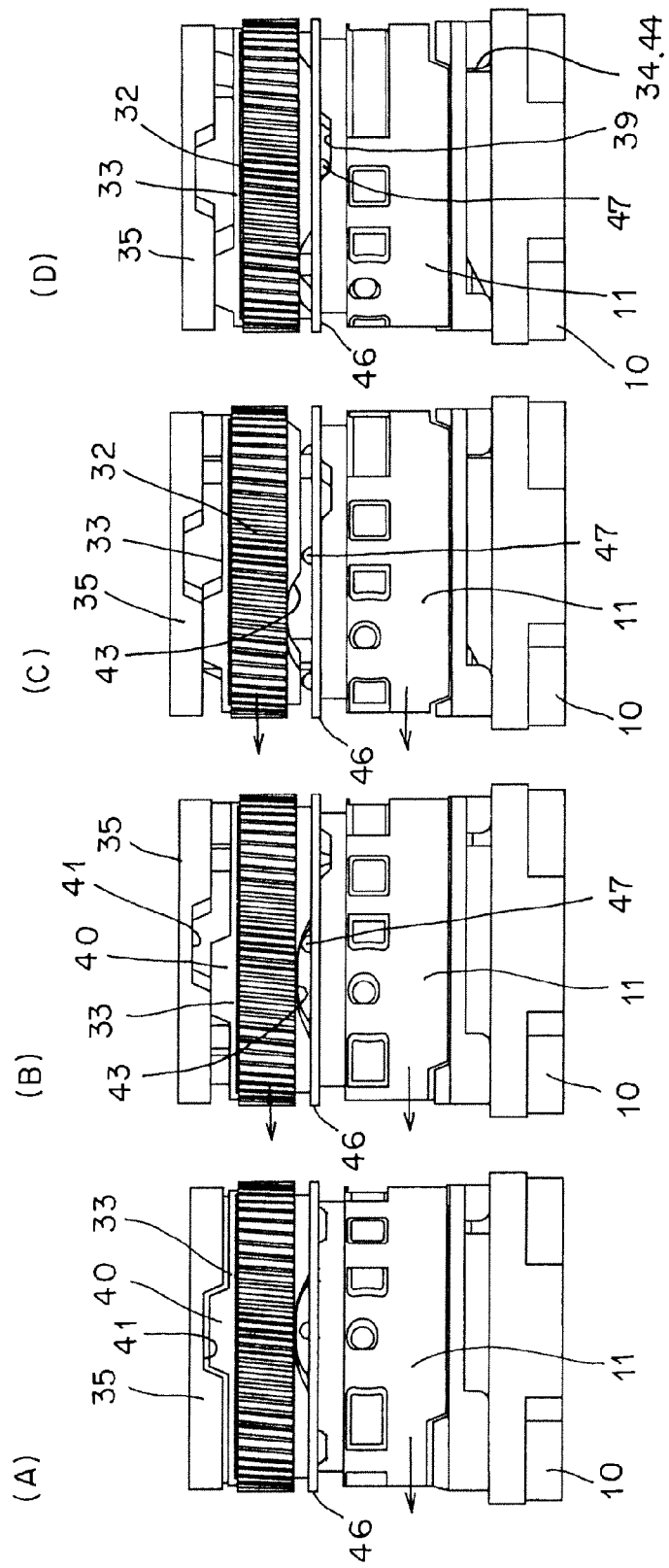
FIG. 16 is an explanatory view showing a state in which the clutch mechanism, the first rotation restraining mechanism, the second rotation restraining mechanism, and the buffering mechanism are assembled in all when the mirror assembly that is positioned in the state of FIG. 15 (storage location) is positioned in the use location in manually driven manner, similarly.

If the mirror assembly 4 that is positioned in the storage location B is manually rotated to the use location A in a manually driven manner, as shown in FIG. 16 (A), a manually driven rotation force that is exerted by a manually driven operation in the direction indicted by the arrow (in the clockwise direction) is applied to the gear case 11. By means of this rotation force, as shown in FIG. 16 (B), the clutch recessed portion 41 of the clutch holder 35 on a fixed side and a clutch protrusive portion 40 of the clutch 33 on a rotating side are disengaged from each other.

As shown in FIG. 16 (C), if the clutch gear 32 on the rotating side rotates in the direction indicated by the arrow (in the clockwise direction), the ball 47 on the fixed side abuts against one tilt face of the recessed portion 43 of the clutch gear 32 and then the clutch gear 32, the clutch 33, and the clutch holder 35 are lifted up against the spring force of a spring 36.

If the mirror assembly 4 is positioned in the use location A, the abutment face 34 of the arc-shaped protrusive portion 28 of the stopper member 6 that is established in the state shown in FIG. 12 (B) abuts against the abutment face 44 of the arc-shaped protrusive portion 42 of the shaft 10, and the state shown in FIG. 12 (C) is established, and thus, rotation in the direction indicated by the arrow (in the clockwise direction) of the gear case 11 is restrained. As a result, by means of the function of the second rotation restraining mechanism, the minor assembly 4 that is positioned in the use location A is restrained from rotating to the side of the forward tilt location C.

On the other hand, as shown in FIG. 16 (D), if the ball 47 on the fixed side is positioned at the recessed portion 39 of the gear case 11 on the rotating side, the ball 47 is pushed by the spring force (a spring load) of the spring 36, drops in the recessed portion 39 and then abuts against one tilt face of the recessed portion 39; and therefore, the rotation in a direction opposite to that indicated by the arrow (in the counterclockwise direction) of the gear case 11 is restrained. The rotation in an upper direction is restrained by means of the clutch gear 32. As a result, by means of the function of the first rotation restraining mechanism, the mirror assembly 4 that is positioned in the use location A is restrained from rotating to the side of the storage location B.

Even in a case where the clutch recessed portion 41 of the clutch holder 35 of the clutch mechanism 15 and the clutch protrusive portion 40 of the clutch 33 are thus disengaged from each other by means of the function of the first rotation restraining mechanism and the function of the second rotation restraining mechanism, the mirror assembly 4 that is positioned in the use location A can be locked relative to the rotation in the forward and backward directions (in each of the clockwise and counterclockwise directions around the rotational center O-O of the shaft 10), thus making it possible to reliably prevent a vibration of the mirror assembly 4 which may be exerted by a vehicle vibration.

As shown in FIG. 16 (D), if the ball 47 on the fixed side is positioned in the recessed portion 39 of the gear case 11 on the rotating side, the ball 47 drops in the recessed portion 39; and therefore the clutch gear 32, the clutch 33, and the clutch holder 35 having been lifted up so far by means of the ball 47 are dropped down by means of the spring force of the spring 36. In this situation, the clutch 33 and the clutch holder 35 still remain in a state in which they are disengaged from each other.

Figure 17:
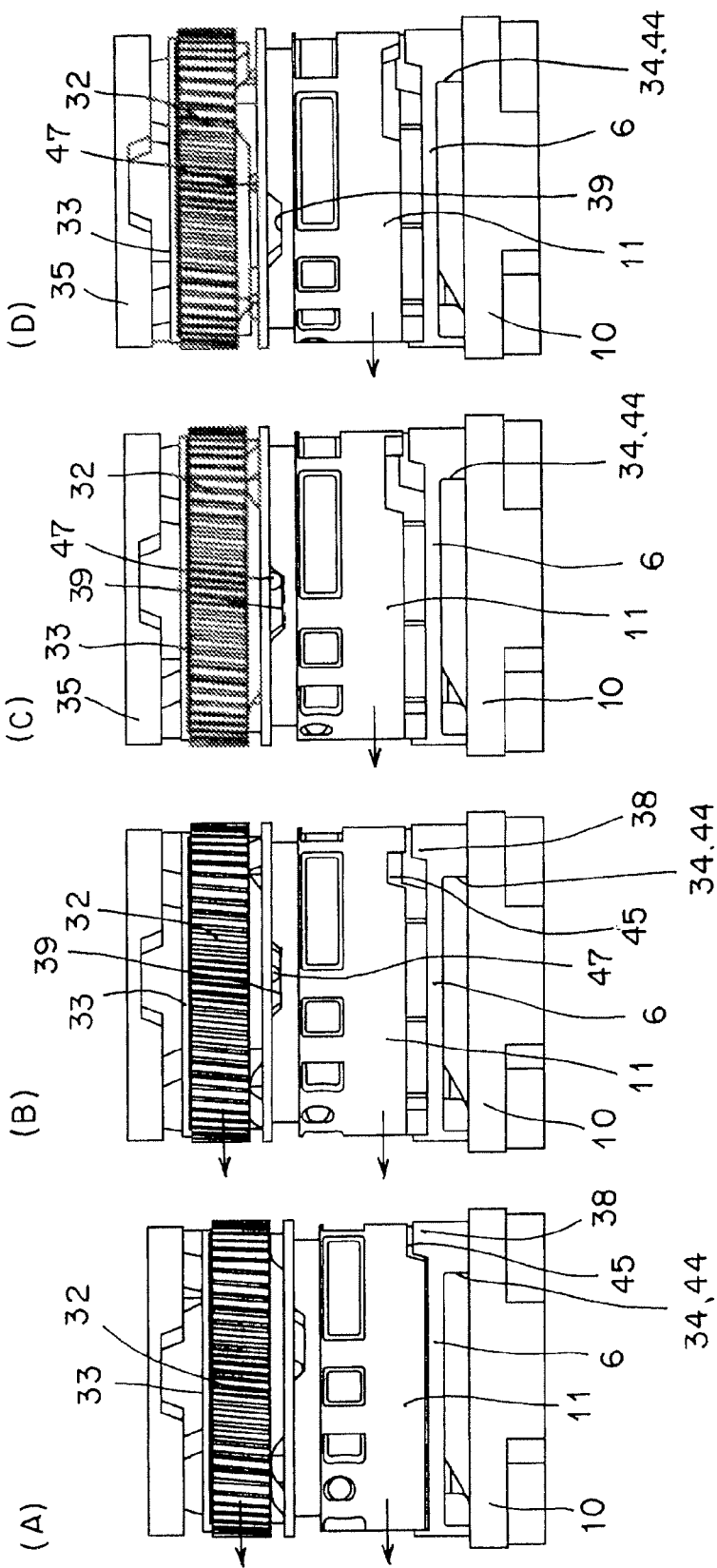
FIG. 17 is an explanatory view showing a state in which the clutch mechanism, the first rotation restraining mechanism, the second rotation restraining mechanism, and the buffering mechanism are assembled in all when the mirror assembly that is positioned in the state of FIG. 16 (in the state in which the mirror assembly that is positioned in the storage location is positioned in the use location in a manually driven manner) is positioned in a forward tilt location in a manually driven manner, similarly.

With reference to FIG. 17, a description will be given with respect to a case in which the mirror assembly 4 that is positioned in the state of FIG. 16 (in the state in which the mirror assembly 4 that is positioned in the storage location B is positioned in the use location A in a manually driven manner) is positioned in a forward tilt location C in a manually driven manner.

As shown in FIG. 17 (A), the gear case 11, the clutch gear 32, and the clutch 33 are about to rotate in the direction indicated by the arrow (in the clockwise direction). However, the abutment face 34 of the arc-shaped protrusive portion 28 of the stopper member 6 abuts against the abutment face 44 of the arc-shaped protrusive portion 42 of the shaft 10; and therefore, the rotation in the direction indicated by the arrow (in the clockwise direction) of the stopper member 6 is restrained.

As shown in FIG. 17 (B), the engagement recessed portion 45 of the gear case 11 and the gear protrusive portion 38 of the stopper member 6 are disengaged from each other and then the gear case 11 rotates in the direction indicated by the arrow (in the clockwise direction) together with the clutch gear 32 and the clutch 33. At this time, the ball 47 on the fixed side is positioned in the recessed portion 39 of the gear case 11 on the rotating side.

As shown in FIG. 17 (C) and FIG. 17 (D), if the gear case 11 rotates in the direction indicated by the arrow (in the clockwise direction), the ball 47 on the fixed side abuts against the other tilt face of the recessed portion 39 of the gear case 11 and travels over the tilt face and then the clutch gear 32, the clutch 33, and the clutch holder 35 are lifted up against the spring force of the spring 36.

In a case where the mirror assembly 4 that is positioned in the forward tilt location C is restored (returned) to the use location A in a manually driven manner, the sequential order of the actuation is reversed; and therefore, a description thereof is omitted herein.

Figure 18:
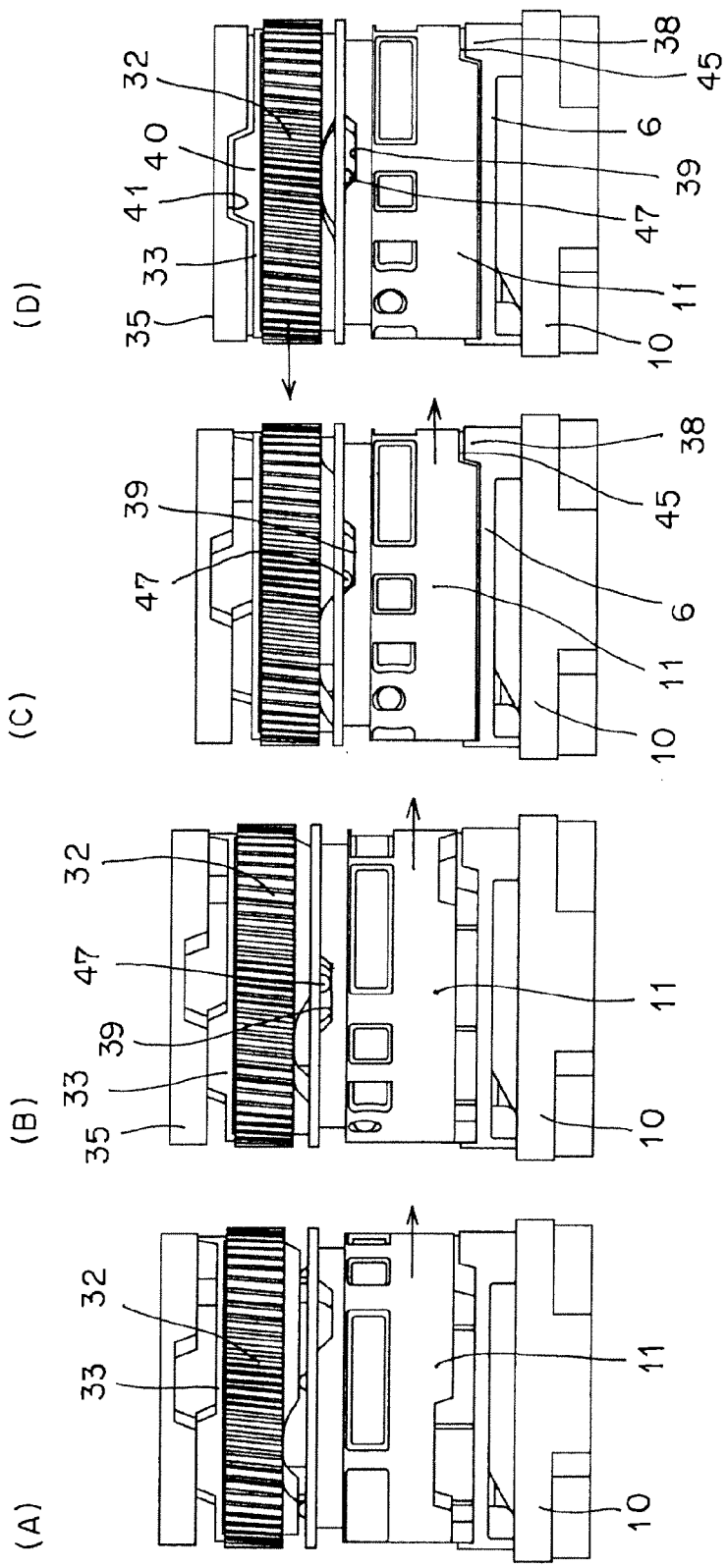
FIG. 18 is an explanatory view showing a state in which the clutch mechanism, the first rotation restraining mechanism, the second rotation restraining mechanism, and the buffering mechanism are assembled in all when the mirror assembly that is positioned in the state of FIG. 17 (in the state in which the mirror assembly that is positioned in the storage location is positioned in the use location in manually driven manner and then is positioned in the forward tilt location in manually driven manner) is positioned in a forward tilt location in a manually driven manner, similarly.

With reference to FIG. 18, a description will be given with respect to a case in which the mirror assembly 4 that is positioned in the state of FIG. 17 (in the state in which the mirror assembly 4 that is positioned in the storage location B is positioned in the use location A in a manually driven manner and then is positioned in the forward tilt location C in a manually driven manner) is positioned in the storage location B in an electrically driven manner.

As shown in FIG. 18 (A), by means of an electrically driven rotation force, the gear case 11 is rotated in the direction indicated by the arrow (in the counterclockwise manner). The clutch gear 32 and the clutch 33 are established in an inactive state in which their relevant rotations are disabled due to a frictional load with the clutch holder 35.

As shown in FIG. 18 (B), if the ball 47 on the fixed side is positioned in the recessed portion 39 of the gear case 11 on the rotating side, the ball 47 drops in the recessed portion 39; and therefore, the clutch gear 32, the clutch 33, and the clutch holder 35 having been lifted up so far by means of the ball 47 are dropped down by means of the spring force of the spring 36. In this situation, the clutch 33 and the clutch holder 35 still remain in a state in which they are disengaged from each other.

As shown in FIG. 18 (C), if the mirror assembly 4 is positioned in the use location A, the ball 47 abuts against one tilt face of the recessed portion 39 of the gear case 11, thus resulting in a load in rotation in the direction indicated by the arrow (in the counterclockwise direction) of the gear case 11. In addition, the gear recessed portion 45 of the gear case 11 and the gear protrusive portion 38 of the stopper member 6, both of which have been disengaged from each other insofar, are engaged with each other again.

As shown in FIG. 18 (D), the clutch gear 32 and the clutch 33 that remain in an inactive state race in the direction indicated by the arrow (in the clockwise direction). Then, a clutch recessed portion 41 of the clutch holder 35 and a clutch protrusive portion 40 of the clutch 33, both of which have been disengaged from each other insofar, are engaged with each other again. In this state, the mirror returns to an initial state of a set state (a use state) in FIG. 15 (A), the returned mirror stops at the storage location B as is in an electrically driven manner, and then, the stopped mirror is electrically driven again to thereby enable restoration (electrically driven to thereby enable restoration to the use location A)

Figure 19:
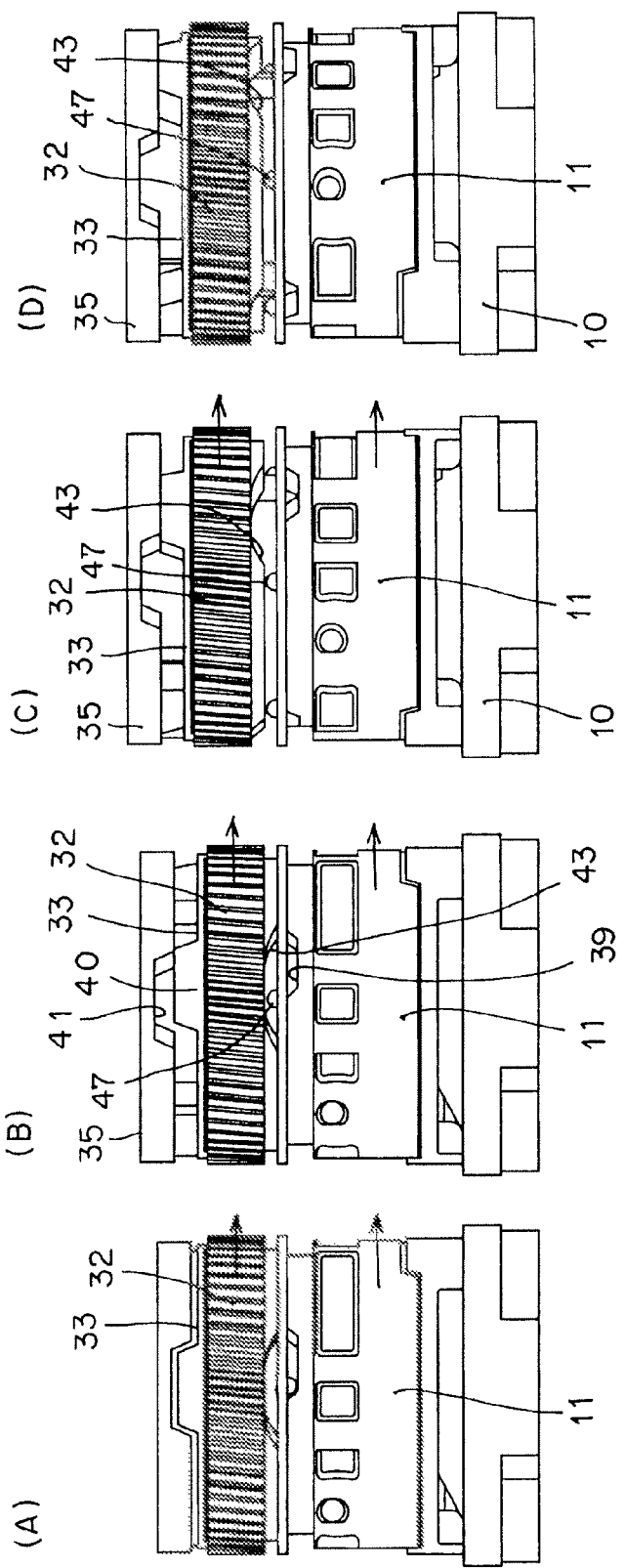
FIG. 19 is an explanatory view showing a state in which the clutch mechanism, the first rotation restraining mechanism, the second rotation restraining mechanism, and the buffering mechanism are assembled in all when a mirror assembly that is positioned in a use location is positioned in a storage location in a manually driven manner, similarly.
Figure 21:
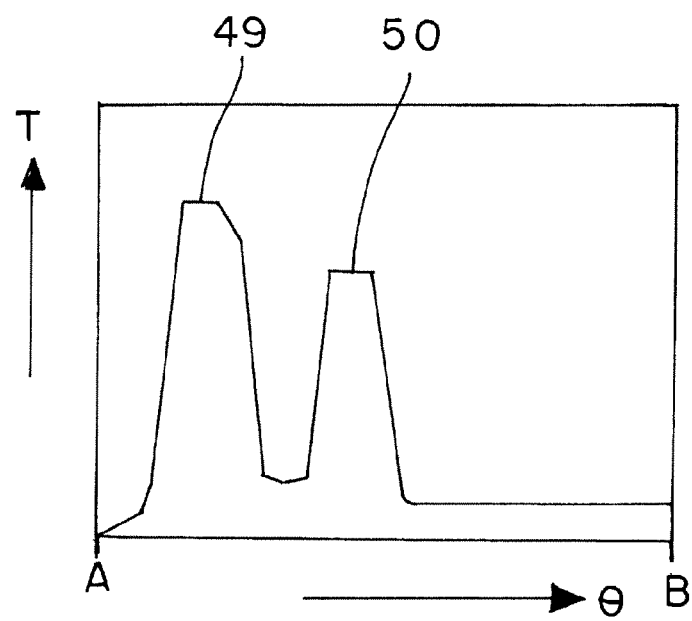
FIG. 21 is an explanatory view showing a time difference between a time of an occurrence of a torque in clutch mechanism and a time of an occurrence of a torque in first rotation restraining mechanism, a respective one of which may occur when the mirror assembly that is positioned in the use location is positioned in the storage location in a manually driven manner, similarly.

With reference to FIG. 19 and FIG. 21, a description will be given with respect to a case in which the mirror assembly 4 that is positioned in the use location A is positioned in the storage location B in a manually driven manner. In FIG. 21, a longitudinal axis T designates a torque, and the direction indicated by the arrow designates a magnitude of the torque. A horizontal axis θ designates a rotational angle (a rotational position or a rotational time) from the use location A to the storage location B of the mirror assembly 4.

As shown in FIG. 19 (A), the gear case 11, the clutch gear 32, and the clutch 33 are about to rotate in the direction indicated by the arrow (in the counterclockwise direction).

As shown in FIG. 19 (B), the clutch recessed portion 41 of the clutch holder 35 on the fixed side and the clutch protrusive portion 40 of the clutch 33 on the rotating side are disengaged from each other. At this time, as designated by reference numeral 49 in FIG. 21, a peak in clutch torque occurs.

At the same time, the ball 47 on the fixed side is pushed up by means of one tilt face of the recessed portion 39 of the gear case 11. A recessed portion 43 of the clutch gear 32 is positioned upward of the ball 47, and therefore, no load occurs when the ball 47 rolls over one tilt face of the recessed portion 39 of the gear case 11.

As shown in FIG. 19 (C) and FIG. 19 (D), if the clutch gear 32 on the rotating side rotates in the direction indicated by the arrow (in the counterclockwise direction), the ball 47 on the fixed side rolls over a top portion of the recessed portion 43 of the clutch gear 32 by backlash and abuts against the other tilt face of the recessed portion 43 of the clutch gear 32, and then, the clutch gear 32, the clutch 33, and the clutch holder 35 are lifted up against the spring force of the spring 36. At this time, as designated by reference numeral 50 in FIG. 21, a peak in torque of the first rotation restraining mechanism occurs.

Herein, the recessed portion 43 of the clutch gear 32 has a predetermined width in the direction around the rotational center O-O of the shaft 10, and therefore, as shown in FIG. 21, there exists a time difference between a peak 49 of clutch torque and a peak 50 in torque of the first rotation restraining mechanism.

Figure 20:
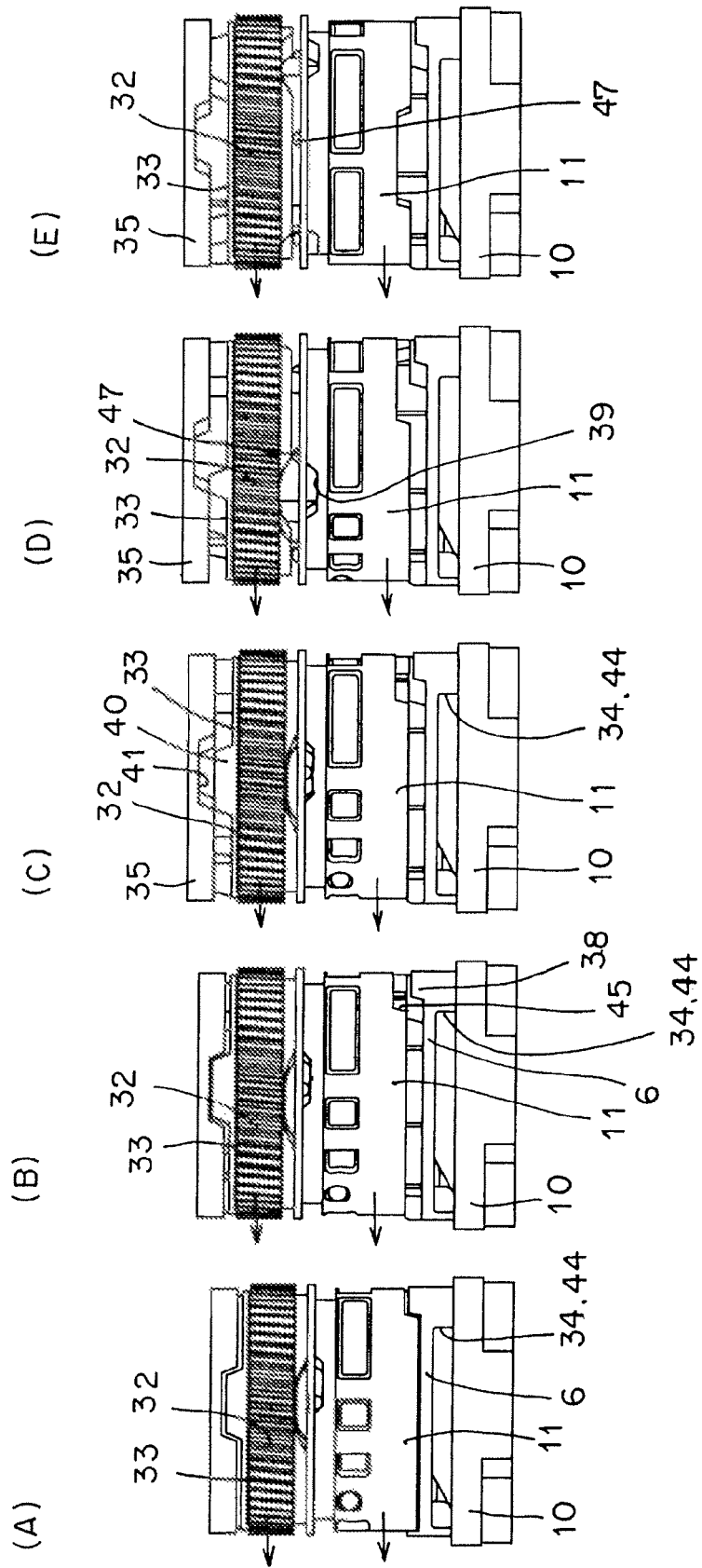
FIG. 20 is an explanatory view showing a state in which the clutch mechanism, the first rotation restraining mechanism, the second rotation restraining mechanism, and the buffering mechanism are assembled in all when the mirror assembly that is positioned in the use location is positioned in a forward tilt location in a manually driven manner, similarly.
Figure 22:
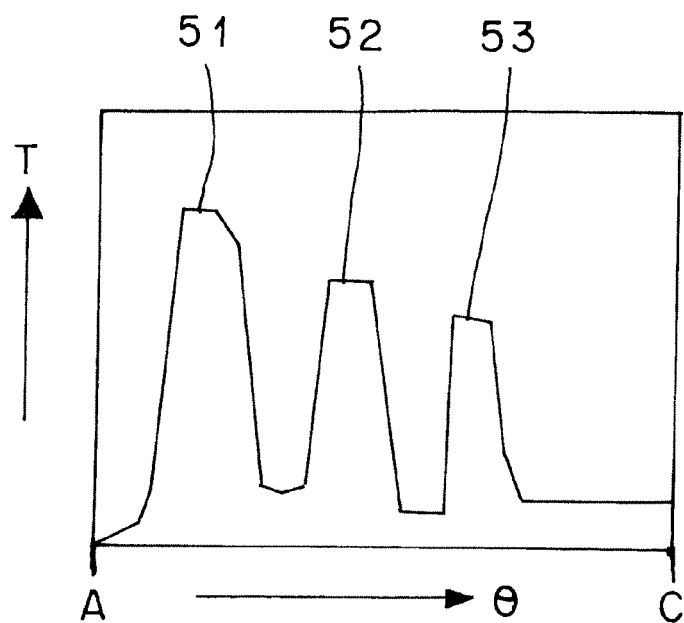
FIG. 22 is an explanatory view showing a time difference between a time of an occurrence of a torque in buffering mechanism, a time of an occurrence of a torque in clutch mechanism, and a time of an occurrence of a torque in first rotation restraining mechanism, a respective one of which may occur when the mirror assembly that is positioned in the use location is positioned in the forward tilt location in a manually driven manner, similarly.

With reference to FIG. 20 and FIG. 22, a description will be given with respect to a case in which the mirror assembly 4 that is positioned in the use location A is positioned in the forward tilt location C in a manually driven manner. In FIG. 22, a longitudinal axis T designates a torque, and the direction indicated by the arrow designates a magnitude of the torque. A horizontal axis θ designates a rotational angle (a rotational position or a rotational time) from the use location A to the forward tilt location C of the mirror assembly 4.

As shown in FIG. 20 (A), the gear case 11, the clutch gear 32, and the clutch 33 are about to rotate in the direction indicated by the arrow (in the clockwise direction). However, the abutment face 34 of the arc-shaped protrusive portion 28 of the stopper member 6 abuts against the abutment face 44 of the arc-shaped protrusive portion 42 of the shaft 10, and therefore, the rotation in the direction indicated by the arrow (in the clockwise direction) of the stopper member 6 is restrained.

As shown in FIG. 20 (B), the gear recessed portion 45 of the gear case 11 and the gear protrusive portion 38 of the stopper member 6 are disengaged from each other and then the gear case 11 rotates in the direction indicated by the arrow (in the clockwise direction) together with the clutch gear 32 and the clutch 33. At this time, as designated by reference numeral 51 in FIG. 22, a peak in torque of the buffer mechanism occurs.

As shown in FIG. 20 (C), a backlash of gears (a helical gear 30 and a clutch gear 32) of a deceleration mechanism 14 or a thrust gap in worm gears (a first worm gear 29 and a second worm gear 31) is clogged, the clutch portion 41 of the clutch holder 35 on the fixed side and the clutch protrusive portion 40 of the clutch 33 on the rotating side are disengaged from each other. At this time, as designated by reference numeral 52 in FIG. 22, a peak in clutch torque occurs.

As shown in FIG. 20 (D) and FIG. 20 (E), the ball 47 on the fixed side rolls over a bottom part of the recessed portion 39 of the gear case 11 on the rotating side by backlash and then, travels over the other tilt face of the recessed portion 39 of the gear case 11, and the clutch gear 32, the clutch 33, and the clutch holder 35 are lifted up against the spring force of the spring 36. At this time, as designated by reference numeral 53 in FIG. 22, a peak in torque of the first rotation restraining mechanism torque occurs.

Here, the recessed portion 39 of the gear case 11 has a predetermined width in the direction around the rotational center O-O of the shaft 10, and therefore, as shown in FIG. 22, there exists a time difference between a peak 51 in torque of the buffeting mechanism, a peak 52 in clutch torque, and a peak 53 in torque of the first rotation restraining mechanism.

(Description of Advantageous Effects)

The electrically driven storage type door mirror device 1 in the first exemplary embodiment is made of the constituent elements and functions described above, and hereinafter, advantageous effects thereof will be described.

The electrically driven storage type door mirror device 1 in the first exemplary embodiment is capable of restraining rotation to a storage location B and rotation to a forward tilt location C of a mirror assembly 4 that is positioned in a use location A, by means of a first rotation restraining mechanism (a recessed portion 39 of a gear case 11 and a ball 47) and a second rotation restraining mechanism (an abutment face 34 of an arc-shaped protrusive portion 28 of a stopper member 6 and an abutment face 44 of an arc-shaped protrusive portion 42 of a shaft 10). In this manner, according to the electrically driven storage type door mirror device 1 in the first exemplary embodiment, the mirror assembly 4 is rotated from the use location A to the storage location B by electrically driving an electrically driven storage unit 3, and then, even in a case where the mirror assembly 4 is rotated (restored) from the storage location B to the use location A in a manually driven manner, in other words, even in a case where a clutch mechanism 15 (an engaged state between a clutch recessed portion 41 of a clutch holder 35 on a fixed side and a clutch protrusive portion 40 of a clutch 33 on a rotating side) is disengaged, the mirror assembly 4 that is positioned in the use location A can be locked, thus making it possible to reliably prevent a vibration of the mirror assembly 4 which may be exerted by a vehicle vibration.

Moreover, according to the electrically driven storage type door mirror device 1 in the first exemplary embodiment, by means of the clutch mechanism 15, the mirror assembly 4 that is positioned in the use location A can be rotated to the storage location B with the use of a force other than an electrically driven rotation force (a manually driven force or a force that is exerted in a case where something hits against the mirror assembly 4). Further, according to the electrically driven storage type door mirror device 1 in the first exemplary embodiment, by means of the clutch mechanism 15 and a buffering mechanism (a gear recessed portion 45 of the gear case 11 and a gear protrusive portion 38 of the stopper member 6), the mirror assembly 4 that is positioned in the use location A can be rotated to a forward tilt location C with the use of a force other than the electrically driven rotation force (the manually driven force or the force that is exerted in a case where something hits against the mirror assembly 4). As a result, the electrically driven storage type door mirror device 1 in the first exemplary embodiment has a function of buffering action. In other words, even in a case where something hits against the mirror assembly 4 that is positioned in the use location A, the mirror assembly 4 that is positioned in the use location A can be rotated to the storage location B or the forward tilt location C, thus making it possible to reliably protect the mirror device 1 itself and something having hit against the mirror assembly 4 from an impact which may be exerted at the time of hitting.

The electrically driven storage type door mirror device 1 in the first exemplary embodiment, as shown in FIG. 21, is capable of displacing a peak 49 in clutch torque of the clutch mechanism 15 and a peak 50 in torque of a first rotation restraining mechanism, which occur when the mirror assembly 4 that is positioned in the use location A is rotated to the storage location B with the force other than the electrically driven rotation force (the manually driven force or the force that may be exerted in a case where something hits against the mirror assembly 4). As a result, the electrically driven storage type door mirror device 1 in the first exemplary embodiment is capable of dispersing torques at the time of applying a buffering action, thus making it possible to further reliably work the mirror device 1 itself or the buffering action in a case where something has hit against the mirror assembly 4.

The electrically driven storage type door mirror device 1 in the first exemplary embodiment, as shown in FIG. 22, is capable of displacing a peak 51 in torque of an interference mechanism, a peak 52 in clutch torque of the clutch mechanism 15, and a peak 53 in torque of the first rotation restraining mechanism, which occur when the mirror assembly 4 that is positioned in the use location A is rotated to the forward tilt position C with the use of a force other than the electrically driven rotation force (the manually driven force or the force that is exerted in a case where something hits against the mirror assembly 4). As a result, the electrically driven storage type door mirror device 1 in the first exemplary embodiment is capable of dispersing a torque at the time of applying of the buffering action, thus making it possible to further reliably work the mirror device 1 itself or the buffering action in a case where something has hit against the mirror assembly 4.

According to the electrically driven storage type door mirror device 1 in the first exemplary embodiment, the first rotation restraining mechanism is made of a metal member, for example, a washer 46 made of an iron plate and a ball 47 made of a metal member, for example, a steel ball, and therefore, its relevant structure is simplified, its relevant manufacturing cost is reduced, and its superior durability is achieved.

[Second Exemplary Embodiment]

Figure 23:
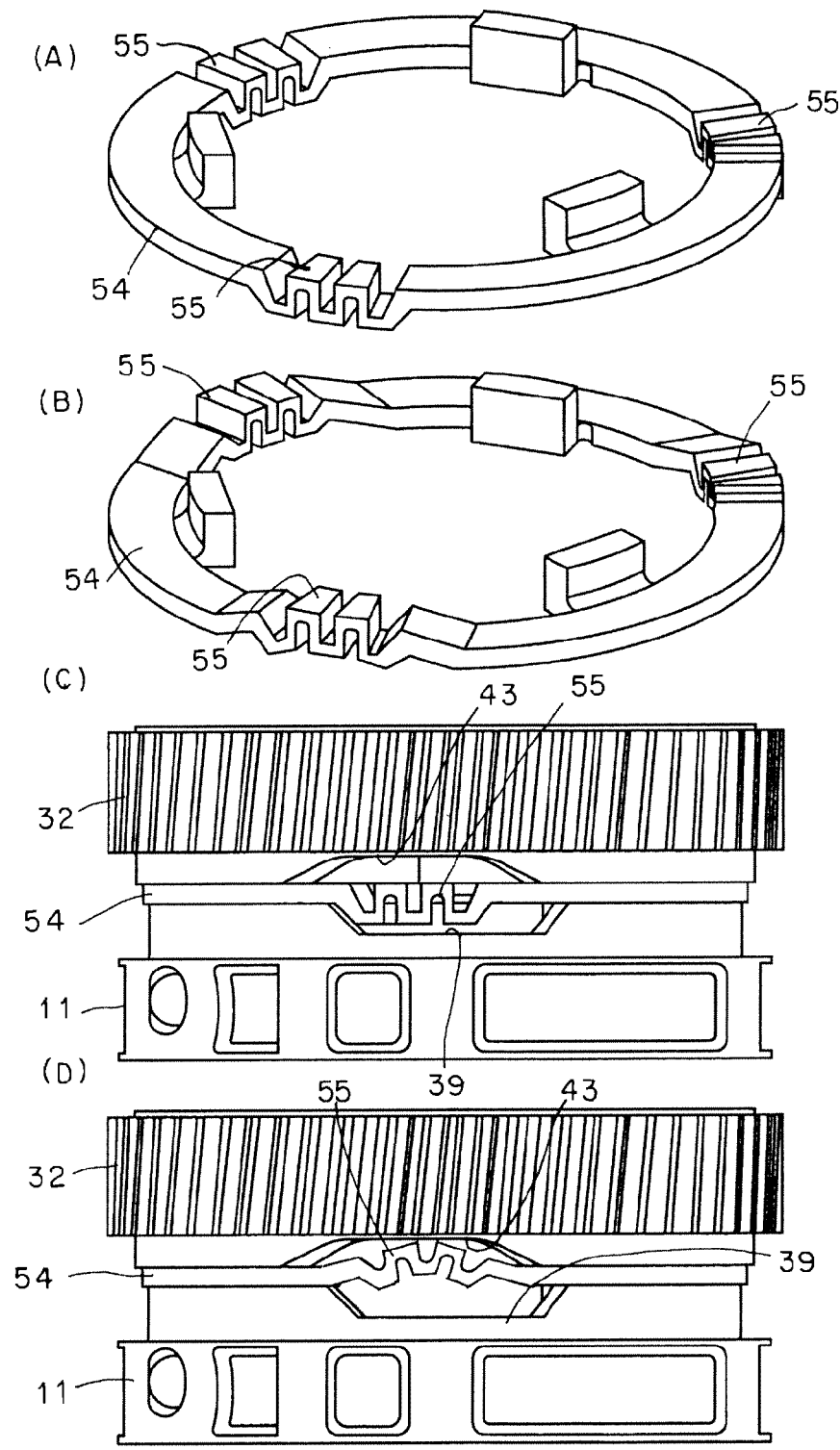
FIG. 23 is an explanatory view of an active state of a first rotation restraining mechanism showing a vehicle outside mirror device according to a second exemplary embodiment of the present invention.

FIG. 23 is an explanatory view of an active state of a first rotation restraining mechanism showing a vehicle outside mirror device according to a second exemplary embodiment of the present invention. In the figure, like constituent elements are designated by like reference numerals in FIG. 1 to FIG. 22.

The first rotation restraining mechanism of the first exemplary embodiment is made of a washer 46 and a ball 47 that are provided separately. According to the first rotation restraining mechanism of the first exemplary embodiment, a washer 54 and a bellows 55 are integrally made of a synthetic resin or a spring member. The state shown in each of FIG. 23 (A) and FIG. 23 (C) is identical to a state in which the ball 47 drops relative to the washer 46. The state shown in each of FIG. 23 (B) and FIG. 23 (D) is identical to a state in which the ball 47 rises relative to the washer 46.

The vehicle outside mirror device according to the second exemplary embodiment is capable of achieving functions and advantageous effects similar to those of the vehicle outside mirror device according to the first embodiment. In particular, the vehicle outside mirror device according to the second exemplary embodiment is provided in such a manner that the first rotation restraining mechanism allows the washer 54 and the bellows 55 to be made of a synthetic resin or a spring member, thus making it possible to reduce the number of parts or the number of assembling hours and reduce the relevant manufacturing cost.

(Description of Examples Other Than First and Second Exemplary Embodiments)

In the foregoing first and second exemplary embodiments, an electrically driven storage type door mirror device has been described. However, the present invention can also be applied to a vehicle outside mirror device other than the electrically driven storage type door mirror. For example, the present invention can be applied to a vehicle outside mirror device of an electrically driven storage type, such as a vehicle fender mirror device of electrically driven storage type.

What is claimed is:

1. A vehicle outside mirror device in which a mirror assembly is rotatably mounted on a vehicle body via an electrically driven storage unit and a base, the electrically driven storage unit comprising:
   a shaft holder fixed to the base;
   a shaft provided at the shaft holder, an arc-shaped portion being integrally provided on the shaft holder;
   a casing rotatably mounted on the shaft and in which the mirror assembly is mounted and having a bottom face, an arc-shaped guide groove around a rotational center of the shaft being provided on the bottom face of the casing;
   a motor and a rotation force transmission mechanism that are housed in the casing, and adapted to electrically drive the mirror assembly to rotate relative to the shaft;
   an electrically driven rotation range restraining mechanism adapted to restrain a range of an electrically driven rotation of the mirror assembly;
   a clutch mechanism provided for the rotation force transmission mechanism and configured to:
      remain engaged upon exertion of an electrically driven rotation force of the motor and the rotation force transmission mechanism, and
      disengage upon exertion a force greater than the electrically driven rotation force so as to permit the mirror assembly to be rotatable relative to the shaft; and
   a holding mechanism that locks the mirror assembly when the mirror assembly is positioned in a use location and the clutch mechanism is disengaged,
   wherein a first end face of the arc-shaped portion and a first end face of the guide groove abut against each other when the mirror assembly is in the use location, and a second end face of the arc-shaped portion and a second end face of the guide groove abut against each other when the mirror assembly is in a storage location.

2. The vehicle outside mirror device according to claim 1, wherein the holding mechanism comprises:
   a first rotation restraining mechanism that restrains rotation to the storage location of the mirror assembly positioned in the use location, the first restraining mechanism being disengaged by the electrically driven rotation force so as to permit rotation to the storage location of the mirror assembly positioned in the use location;
   a second rotation restraining mechanism that restrains rotation to a forward tilt location of the mirror assembly positioned in the use location; and
   a buffering mechanism disengaged by a force other than the electrically driven rotation force so as to permit rotation to the forward tilt location of the mirror assembly positioned in the use location.

3. The vehicle outside mirror device according to claim 2, wherein a time of an occurrence of a torque of the clutch mechanism and a time of an occurrence of a torque of the first rotation restraining mechanism have a time difference therebetween, a respective one of the torques occurring when the mirror assembly positioned in the use location is rotated to the storage location by a force other than the electrically driven rotation force.

4. The vehicle outside mirror device according to claim 2, wherein a time of an occurrence of a torque of the buffering mechanism, a time of an occurrence of a torque of the clutch mechanism, and a time of an occurrence of a torque of the first rotation restraining mechanism have a time difference therebetween, a respective one of the torques occurring when the mirror assembly positioned in the use location is rotated to the forward tilt location by a force other than the electrically driven rotation force.

5. A vehicle outside mirror device in which a mirror assembly is rotatably mounted on a vehicle body via an electrically driven storage unit and a base, the electrically driven storage unit comprising:
   a shaft holder fixed to the base;
   a shaft provided at the shaft holder ;
   a casing rotatably mounted on the shaft and in which the mirror assembly is mounted, the casing comprising a plurality of recessed portions;
   a stopper disposed between the shaft holder and the casing, the stopper comprising at least one protrusive portion projecting radially outwards with respect to the shaft;
   a motor and a rotation force transmission mechanism that are housed in the casing and adapted to electrically drive the mirror assembly to rotate relative to the shaft;
   an electrically driven rotation range restraining mechanism that is adapted to restrain a range of an electrically driven rotation of the mirror assembly;
   a clutch mechanism provided for the rotation force transmission mechanism and configured to
      remain engaged upon exertion of an electrically driven rotation force of the motor and the rotation force transmission mechanism, and
      disengage upon exertion of a force greater than the electrically driven rotation force so as to permit the mirror assembly to be rotatable relative to the shaft;
   a holding mechanism that locks the mirror assembly when the mirror assembly is positioned in a use location and the clutch mechanism is disengaged, and
   a buffering mechanism comprising the recessed portions of the casing and the at least one protrusive portion of the stopper, which buffering mechanism is configured to be disengaged by a force other than the electrically driven rotation force so as to permit rotation to a forward tilt location of the mirror assembly positioned in the use location,
   wherein the holding mechanism is configured to move in a direction of a rotational center of the shaft and includes a first rotation restraining mechanism that locks the mirror assembly in the use location by moving in the direction of the rotational center of the shaft in accordance with rotational movement of the clutch mechanism when the clutch mechanism is disengaged.

6. The vehicle outside mirror device according to claim 5, wherein the first rotation restraining mechanism comprises a washer that is unrotatable relative to the shaft and a ball provided for the washer, the ball being movable in a vertical direction relative to the washer.

7. The vehicle outside mirror device according to claim 5, wherein the holding mechanism further includes a second rotation restraining mechanism that locks the mirror assembly relative to a rotation direction opposite to a rotation direction of the mirror assembly locked by the first rotation restraining mechanism, wherein the second rotation restraining mechanism locks the mirror assembly via a partial abutment between the shaft holder and the casing when the clutch mechanism is disengaged.

8. A vehicle outside mirror device in which a mirror assembly is rotatably mounted on a vehicle body via an electrically driven storage unit and a base, the electrically driven storage unit comprising:

a shaft holder fixed to the base;

a shaft provided at the shaft holder;

a casing rotatably mounted on the shaft and in which the mirror assembly is mounted;

a motor and a rotation force transmission mechanism that are housed in the casing and adapted to electrically drive the mirror assembly to rotate relative to the shaft;

an electrically driven rotation range restraining mechanism that is adapted to restrain a range of an electrically driven rotation of the mirror assembly;

a clutch mechanism provided for the rotation force transmission mechanism and configured to remain engaged upon exertion of an electrically driven rotation force of the motor and the rotation force transmission mechanism, and disengage upon exertion of a force greater than the electrically driven rotation force so as to permit the mirror assembly to be rotatable relative to the shaft; and a holding mechanism that locks the mirror assembly when the mirror assembly is positioned in a use location and the clutch mechanism is disengaged, wherein the holding mechanism is configured to move in a direction of a rotational center of the shaft and includes a first rotation restraining mechanism that locks the mirror assembly in the use location by moving in the direction of the rotational center of the shaft in accordance with rotational movement of the clutch mechanism when the clutch mechanism is disengaged, wherein the first rotation restraining mechanism comprises a washer that is unrotatable relative to the shaft and a bellows provided for the washer, the bellows being movable in a vertical direction relative to the washer.

* * * * *